US 8,466,875 B2

(12) United States Patent
Nakada et al.

(10) Patent No.: US 8,466,875 B2
(45) Date of Patent: Jun. 18, 2013

(54) ELECTROENCEPHALOGRAM INTERFACE SYSTEM, ELECTROENCEPHALOGRAM INTERFACE APPARATUS, METHOD, AND COMPUTER PROGRAM

(75) Inventors: Toru Nakada, Kyoto (JP); Koji Morikawa, Kyoto (JP)

(73) Assignee: Panasonic Corporation, Osaka (JP)

( * ) Notice: Subject to any disclaimer, the term of this patent is extended or adjusted under 35 U.S.C. 154(b) by 595 days.

(21) Appl. No.: 12/534,318

(22) Filed: Aug. 3, 2009

(65) Prior Publication Data
US 2009/0289895 A1 Nov. 26, 2009

(30) Foreign Application Priority Data

Jan. 25, 2008 (JP) ................................. 2008-014901

(51) Int. Cl.
*G09G 5/08* (2006.01)

(52) U.S. Cl.
USPC ............ 345/157; 345/156; 345/158; 600/544

(58) Field of Classification Search
USPC ................... 345/156–158; 600/544
See application file for complete search history.

(56) References Cited

U.S. PATENT DOCUMENTS

| | | | | |
|---|---|---|---|---|
| 5,689,619 | A * | 11/1997 | Smyth | 706/45 |
| 7,091,928 | B2 * | 8/2006 | Rajasingham | 345/7 |
| 2005/0017870 | A1 * | 1/2005 | Allison et al. | 340/825.19 |
| 2005/0195165 | A1 * | 9/2005 | Mitchell | 345/158 |
| 2006/0256083 | A1 * | 11/2006 | Rosenberg | 345/156 |
| 2007/0164990 | A1 * | 7/2007 | Bjorklund et al. | 345/156 |
| 2007/0236488 | A1 * | 10/2007 | Mathan et al. | 345/418 |
| 2008/0030463 | A1 * | 2/2008 | Forest | 345/156 |
| 2009/0179853 | A1 * | 7/2009 | Beale | 345/156 |

FOREIGN PATENT DOCUMENTS

| | | |
|---|---|---|
| JP | 64-46122 | 2/1989 |
| JP | 8-272517 | 10/1996 |
| JP | 10-187334 | 7/1998 |
| JP | 2005-21569 | 1/2005 |
| JP | 2005-34620 | 2/2005 |
| JP | 2006-204855 | 8/2006 |

OTHER PUBLICATIONS

Donchin, Emanuel et al., The Mental Prosthesis: Assessing the Speed of a P300-Based Brain-Computer Interface, IEEE Transactions on Rehabilitation Engineering, vol. 8, No. 2, Jun. 2000, pp. 174-179 (cited in [0008], p. 4 of the specification).

Sellers, Eric, "A P300 event-related potential brain-computer interface(BCI): The effects of matrix size and inter stimulus interval on performance", Biological Psychology, vol. 73(2006), pp. 242-252 (cited in [0160], p. 69 of the specification).

Sukenaka, Atsuko et al., "A Method of Question in Communication Aids based on Event Related brain Potentials", IPSJ SIG Notes, Sep. 12, 1996, vol. 96, No. 85, pp. 17-24.

Form PCT/ISA/237 and a partial English translation for PCT/JP2009/00172.

* cited by examiner

Primary Examiner — Christopher E Leiby
(74) Attorney, Agent, or Firm — Renner, Otto, Boisselle & Sklar LLP

(57) ABSTRACT

An electroencephalogram interface system includes: sections for measuring an electroencephalogram and an eye movement; an output section for presenting on a screen an option related to a device operation; a highlight determination section for, if a predetermined time has elapsed since a rotational angular velocity of the eye movement becomes equal to or less than a threshold value, identifying a region of the screen in which the user is fixing one's gaze based on the eye movement, and determining an option to be highlighted; an interface section for highlighting the determined option, and determining an operation of the device based on an event-related potential in the signal based on the timing of highlighting the option; and a timing adjustment section for adjusting a timing of beginning highlighting based on the eye movement after a process of displaying the option on the screen is begun and until the option is displayed on the screen.

19 Claims, 13 Drawing Sheets

FIG.5

| | CORNEO-RETINAL POTENTIAL | ANGLE OF ROTATION OF EYEBALL | FIXATION POSITION |
|---|---|---|---|
| HORIZONTAL DIRECTION (RIGHT) | +50 $\mu$V (E1) | 5 DEGREES (RIGHT) | X1 |
| HORIZONTAL DIRECTION (LEFT) | −50 $\mu$V (E1) | 5 DEGREES (LEFT) | X4 |
| ⋮ | ⋮ | ⋮ | ⋮ |
| VERTICAL DIRECTION (UP) | +30 $\mu$V (E2) | 5 DEGREES (UP) | Y1 |
| VERTICAL DIRECTION (DOWN) | −30 $\mu$V (E2) | 5 DEGREES (DOWN) | Y4 |
| ⋮ | ⋮ | ⋮ | ⋮ |

(a) CALIBRATION INFORMATION

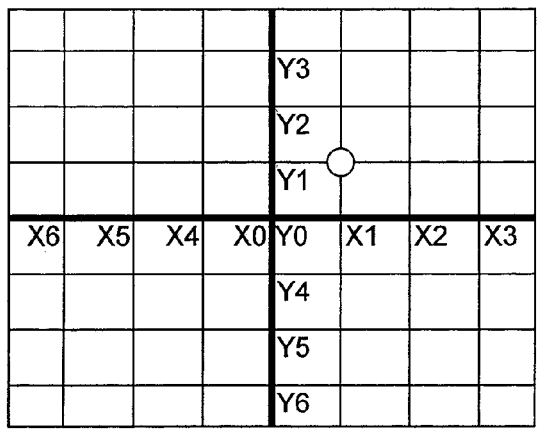

(b) COORDINATES OF FIXATION POSITION ON DISPLAY SCREEN

FIG.6

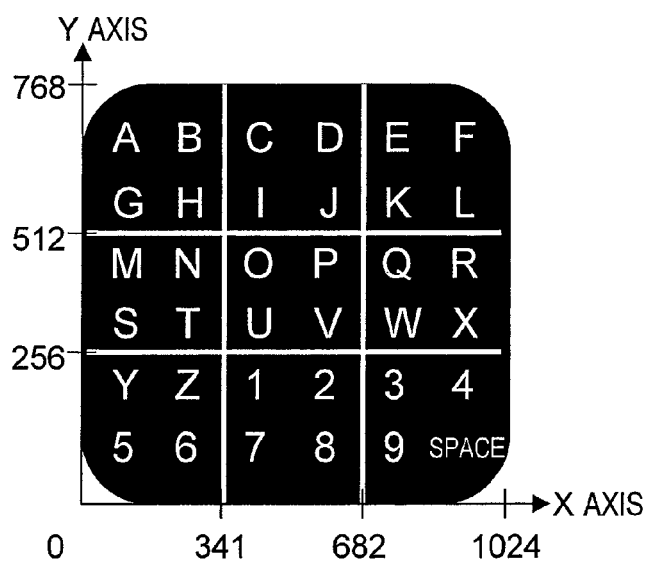

| SCREEN No. | REGION No. | X AXIS COORDINATE RANGE | Y AXIS COORDINATE RANGE | OPTIONS CONTAINED |
|---|---|---|---|---|
| 1 | 1 | (0, 340) | (512, 768) | OPTION A, OPTION B, OPTION G, OPTION H |
| 1 | 2 | (341, 682) | (512, 768) | OPTION C, OPTION D, OPTION I, OPTION J |
| ... | ... | ... | ... | ... |

FIG.12
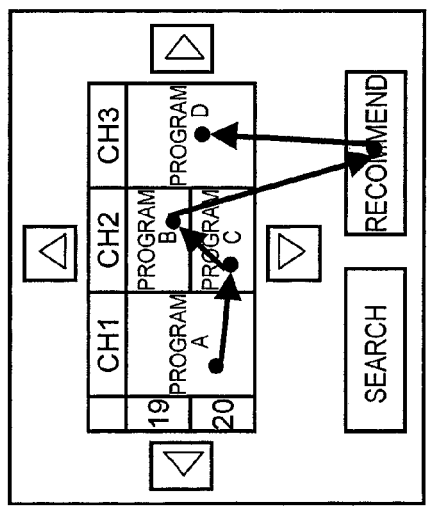
(a)-2 FIXATION POSITION IN IF SCREEN -2
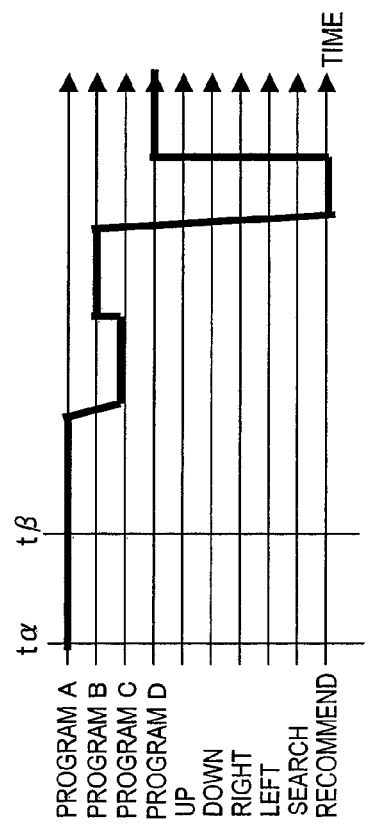
(b)-2 TIMING CHART -2
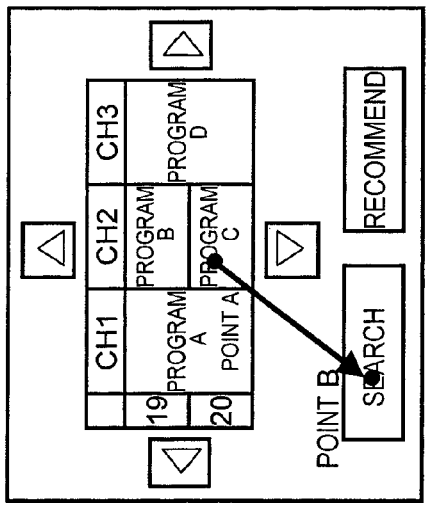
(a)-1 FIXATION POSITION IN IF SCREEN -1
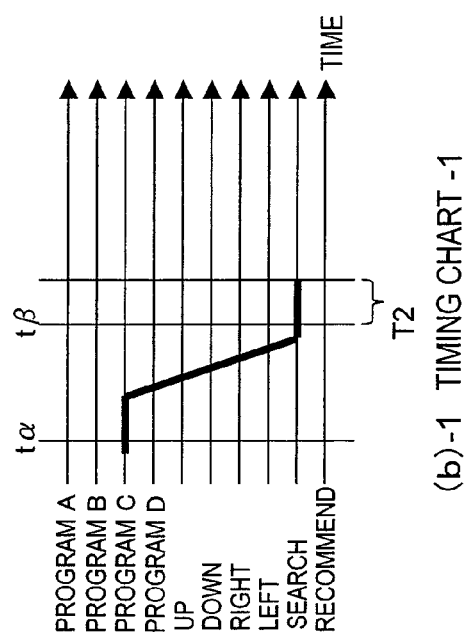
(b)-1 TIMING CHART -1

*FIG.17*
(a)
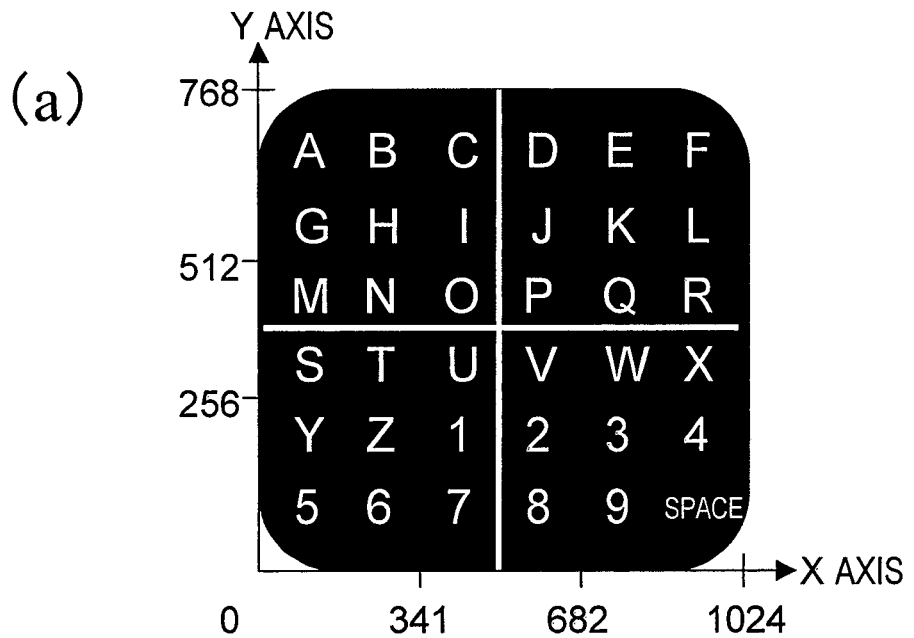
(b)
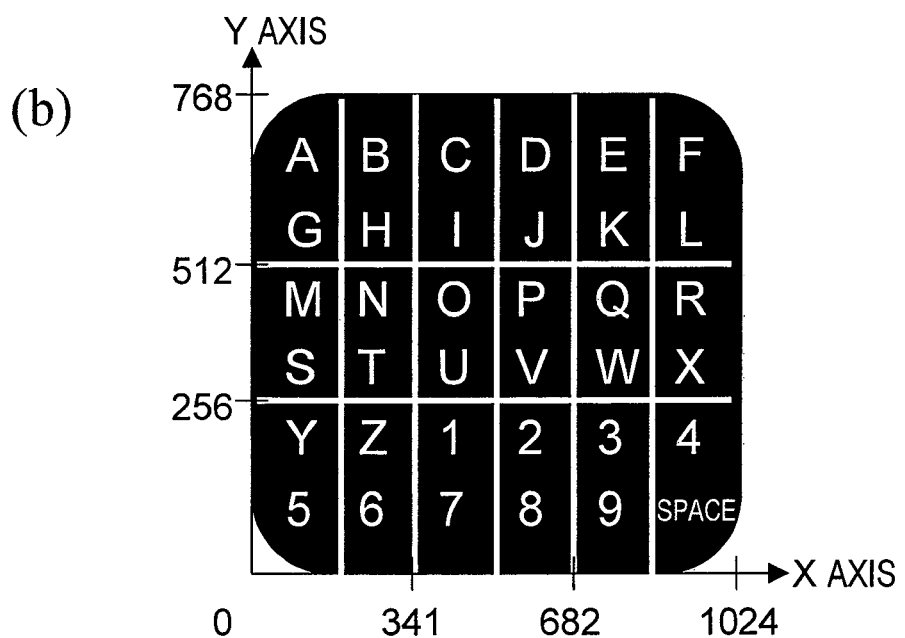

ELECTROENCEPHALOGRAM INTERFACE SYSTEM, ELECTROENCEPHALOGRAM INTERFACE APPARATUS, METHOD, AND COMPUTER PROGRAM

This is a continuation of International Application No. PCT/JP2009/000172, with an international filing date of Jan. 20, 2009, which claims priority of Japanese Patent Application No. 2008-014901, filed on Jan. 25, 2008, the contents of which are hereby incorporated by reference.

BACKGROUND OF THE INVENTION

1. Field of the Invention

The present invention relates to an interface (electroencephalogram interface) system with which it is possible to manipulate a device by utilizing an electroencephalogram. More specifically, the present invention relates to an electroencephalogram interface system having a function of efficiently selecting an option which is desired by a user, from among a large number of options.

2. Description of the Related Art

In recent years, various types of information devices such as television sets, mobile phones, and PDAs (Personal Digital Assistants) have become prevalent, and thus a user needs to manipulate information devices in many scenes of usual life. Usually, as the manipulation inputting means thereof, methods such as pressing a button, moving a cursor and making a confirmation, and manipulating a mouse while watching a screen are used.

However, when both hands are unavailable due to tasks other than device manipulations, e.g., household chores, rearing of children, and driving an automobile, it is difficult to make an input by using the manipulation inputting means, so that a device manipulation cannot be realized. Therefore, there is an increasing needs of users to manipulate information devices in all situations.

Against such needs, an input means utilizing a biological signal from a user, or more specifically, an electroencephalogram interface which utilizes an event-related potential of an electroencephalogram of a user, has been developed. As used herein, an "event-related potential" refers to a transient potential fluctuation in the brain which occurs in temporal relationship with an external or internal event. An electroencephalogram interface utilizes an event-related potential which is measured since the timing of occurrence of an external event as a starting point. For example, it is supposedly possible to select a menu option by utilizing a component called P300 of an event-related potential which occurs in response to a visual stimulation or the like. The "P300" refers to a positive component of the event-related potential which appears around 300 milliseconds since the starting point.

Japanese Laid-Open Patent Publication No. 2005-discloses an electroencephalogram interface technique which uses an event-related potential to distinguish an option that a user wishes to select. To specifically explain the technique which is described in Japanese Laid-Open Patent Publication No. 2005-34620, options are randomly highlighted at a constant time interval, and the waveform of an event-related potential which appears about 300 milliseconds after the timing of highlighting an option as a starting point is utilized, thereby realizing distinction of an option which the user wishes to select. According to this technique, even in a situation where both hands are full, or even in a situation where the user is unable to move his or her limbs due to an illness or the like, the user can select an option which they wish to select. Thus, an interface for device manipulations, etc., that meets the aforementioned needs is realized.

In order to allow an event-related potential to be used for an interface, visual stimulations are necessary, e.g., allowing an option to be highlighted or popped up on an interface screen. In the case where there are many options (e.g., ten and a few, or several dozens), too much time will be required if each is individually highlighted, and therefore it is important to highlight them efficiently.

FIG. 18 shows an interface screen which is described in "The Mental Prosthesis: Assessing the Speed of a P300-Based Brain-Computer Interface", Emanuel Donchin and two others, IEEE TRANSACTIONS ON REHABILITATION ENGINEERING, Vol. 8, No. 2, June, 2000 (hereinafter, Non-Patent Document 1). Thirty-six text characters are displayed in a 6×6 matrix. In Non-Patent Document 1, each row and each column are randomly highlighted at a constant time interval, and by utilizing the aforementioned event-related potential, it is distinguished at which row and which column the user is wishing to select a text character. As a result, the number of highlighting is reduced to 6+6=12 times, as opposed to 36 times which would have been required to individually highlight each.

On the other hand, a line-of-sight inputting interface technique employing a line-of-sight detection device has conventionally been proposed, as illustrated in Japanese Laid-Open Patent Publication No. 10-187334, for example. In Japanese Laid-Open Patent Publication No. 10-187334, a fixation region of a user on an interface screen is detected, and an option which is in the fixation region is regarded as being in a selected state. Then, when an option in a selected state exists, if the user's motion of closing an eyelid for a sufficiently long time (eyelid closure motion) is detected, it is determined that the selection of the option is finalized. As a result, a signal finalizing an inputting of information is output, whereby the selection is finalized.

According to this technique, if a threshold value of the time for detecting an eyelid closure motion of the user is set to a small value, for example, even an unconsciously performed blink will be incorrectly detected as the selection of an option being finalized, thus leading to a possibility that an inputting of information not intended by the user may occur. On the other hand, if the threshold value of the time for detecting an eyelid closure motion of the user is set to a large value, the possibility of incorrect detections related to blinks will be reduced, but the user will need to consciously maintain an eyelid closure motion for a long time, such that muscles around the eye may be fatigued due to too much strain.

As described above, a line-of-sight inputting interface compels a user to undergo a predetermined motion when finalizing the selection/execution of an option, whereas an electroencephalogram interface is very effective because of being able to distinguish an option that a user is wishing to select without compelling the user to undergo any predetermined motion.

In the above-described electroencephalogram interface technique, the options to be highlighted, the timing of beginning highlighting, and the time interval of highlighting are all uniquely determined by the interface system. Therefore, a user utilizing an electroencephalogram interface needs to wait for the desired option to be highlighted, and needs to keep his or her gaze fixed at the interface screen even while undesired options are highlighted. Therefore, options cannot always be selected efficiently.

As a result, the following problems have occurred.

A first example is that, even if the coordinate position of an option which is displayed on an electroencephalogram interface is clear, the user cannot quickly select an option of interest. In the case of the 6×6 options in Non-Patent Document 1 as described above, assuming that the highlighting interval is 350 milliseconds, as much time as 4.2 seconds (=350 milliseconds×12 times) will be required for one selection. This is a long time which would result in a feeling of inconvenience or frustration when a manipulation of a device to be used daily is contemplated.

A second example is that a user who is unclear and undecided as to what to select cannot smoothly make up his or her mind. The reason is that, when a large number of options are highlighted to a user who is unclear as to what to select, such highlighting will be unnecessary and disturbing to the user. When implementing an electroencephalogram interface in a daily application, the expected functions need to be exhibited without allowing the user to feel inconvenience or frustration.

An objective of the present invention is to, in a system having an interface which utilizes an electroencephalogram, allow a user wishing to select an option whose displayed position on an electroencephalogram interface is clear, or a user who is unclear as to which option should be selected, to efficiently select the option that is desired by the user from among a large number of options, without feeling inconvenience or frustration concerning the system.

SUMMARY OF THE INVENTION

An electroencephalogram interface system according to the present invention is used for controlling an operation of a device by utilizing an electroencephalogram signal of a user, and comprises: an electroencephalogram measurement section for measuring an electroencephalogram signal of the user; an eye movement measurement section for measuring an eye movement of the user; an output section for presenting on a screen an option which is related to an operation of a device; a highlight determination section for determining whether a predetermined time has elapsed or not since a point in time when a rotational angular velocity of the eye movement becomes equal to or less than a prestored threshold value, and if the predetermined time has elapsed, identifying a region of the screen in which the user is fixing his or her gaze based on the eye movement, and determining an option to be highlighted; an interface section for highlighting the option determined by the highlight determination section, distinguishing a component of an event-related potential contained in the electroencephalogram signal based on the timing of highlighting the option as a starting point, and determining an operation of the device based on the distinguished component; and a timing adjustment section for adjusting a timing of beginning highlighting, based on the eye movement after a process of displaying the screen is begun and until the screen is displayed.

If an amount of change in the eye movement becomes equal to or greater than a prestored threshold value, the timing adjustment section may cause highlighting of the option to be begun when the amount of change in the eye movement has remained equal to or less than a prestored threshold value for a time which is shorter than the predetermined time after the screen is displayed.

If the user fixes his or her gaze in a region of the screen after the screen is displayed, the timing adjustment section may measure a fixation time in each fixation region, and, if an average value of the measurement time becomes equal to or greater than the predetermined time, cause the option to be highlighted when an amount of change in the eye movement has remained equal to or less than a prestored threshold value for a time which is longer than the predetermined time.

The highlight determination section may determine an option which is contained in the region of the screen as an option to be highlighted.

The interface section may change, on the screen, at least one of luminance, hue, and magnitude of the option having been determined by the highlight determination section, thereby highlighting the determined option.

The interface section may change a method of highlighting depending on the number of options determined by the highlight determination section.

If there is a plurality of options determined by the highlight determination section, the plurality of options may be highlighted randomly or consecutively with a predetermined highlighting interval.

The highlight determination section may determine no option to be highlighted if no option exists in the region of the screen.

The electroencephalogram interface system may further comprise an interval adjustment section for adjusting a time interval of highlighting based on the eye movement.

The interval adjustment section may adjust a time interval of highlighting based on the eye movement after the process of displaying the screen is begun and until the screen is displayed.

If an amount of change in the eye movement becomes equal to or greater than a prestored threshold value, the interval adjustment section may adjust the time interval of highlighting to be shorter than a setting value when an amount of change in the eye movement has remained equal to or less than a prestored threshold value for a time which is shorter than the predetermined time after the screen is displayed.

If the user fixes his or her gaze in a region of the screen after the screen is displayed, the interval adjustment section may measure a fixation time in each fixation region, and, if an average value of the measurement time becomes equal to or greater than the predetermined time, adjust the time interval of highlighting to be longer than a setting value.

Another electroencephalogram interface system according to the present invention is used for controlling an operation of a device by utilizing an electroencephalogram signal of a user, and comprises: an electroencephalogram measurement section for measuring an electroencephalogram signal of the user; an eye movement measurement section for measuring an eye movement of the user; an output section for presenting on a screen an option which is related to an operation of a device; a highlight determination section for determining whether a predetermined time has elapsed or not since a point in time when a rotational angular velocity of the eye movement becomes equal to or less than a prestored threshold value, and if the predetermined time has elapsed, identifying a region of the screen in which the user is fixing his or her gaze based on the eye movement, and determining an option to be highlighted; and an interface section for highlighting the option determined by the highlight determination section, distinguishing a component of an event-related potential contained in the electroencephalogram signal based on the timing of highlighting the option as a starting point, and determining an operation of the device based on the distinguished component.

The highlight determination section may determine an option which is contained in the region of the screen as an option to be highlighted.

The interface section may change, on the screen, at least one of luminance, hue, and magnitude of the option having been determined by the highlight determination section, thereby highlighting the determined option.

The interface section may change a method of highlighting depending on the number of options determined by the highlight determination section.

If there is a plurality of options determined by the highlight determination section, the plurality of options may be highlighted randomly or consecutively with a predetermined highlighting interval.

The highlight determination section may determine no option to be highlighted if no option exists in the region of the screen.

An electroencephalogram interface apparatus according to the present invention is employed in an electroencephalogram interface apparatus for use in an electroencephalogram interface system for presenting on a screen an option which is related to an operation of a device, and controlling an operation of the device by utilizing an eye movement and an electroencephalogram signal of the user. The electroencephalogram interface system includes an electroencephalogram measurement section for measuring an electroencephalogram signal of the user, and an eye movement measurement section for measuring an eye movement of the user. The electroencephalogram interface apparatus comprises: a highlight determination section for determining whether a predetermined time has elapsed or not since a point in time when a rotational angular velocity of the eye movement received from the eye movement measurement section becomes equal to or less than a prestored threshold value, and if the predetermined time has elapsed, identifying a region of the screen in which the user is fixing his or her gaze based on the eye movement, and determining an option to be highlighted; an interface section for highlighting the option determined by the highlight determination section, distinguishing a component of an event-related potential contained in the electroencephalogram signal received from the electroencephalogram measurement section based on the timing of highlighting the option as a starting point, and determining an operation of the device based on the distinguished component; and a timing adjustment section for adjusting a timing of beginning highlighting, based on the eye movement after a process of displaying the screen is begun and until the screen is displayed.

A method according to the present invention is a method for use in an electroencephalogram interface system for controlling an operation of a device by utilizing an electroencephalogram signal of a user, comprising the steps of: measuring an electroencephalogram signal of the user; measuring an eye movement of the user; presenting on a screen an option which is related to an operation of a device; determining whether a predetermined time has elapsed or not since a point in time when a rotational angular velocity of the eye movement becomes equal to or less than a prestored threshold value; if the predetermined time has elapsed, identifying a region of the screen in which the user is fixing his or her gaze based on the eye movement, and determining an option to be highlighted; highlighting the determined option, and distinguishing a component of an event-related potential contained in the electroencephalogram signal based on the timing of highlighting the option as a starting point; determining an operation of the device based on the distinguished component; and adjusting a timing of beginning highlighting based on the eye movement after a process of displaying the screen is begun and until the screen is displayed.

A method according to the present invention is a method for use in an electroencephalogram interface system for controlling an operation of a device by utilizing an electroencephalogram signal of a user, comprising the steps of: measuring an electroencephalogram signal of the user; measuring an eye movement of the user; presenting on a screen an option which is related to an operation of a device; determining whether a predetermined time has elapsed or not since a point in time when a rotational angular velocity of the eye movement becomes equal to or less than a prestored threshold value; if the predetermined time has elapsed, identifying a region of the screen in which the user is fixing his or her gaze based on the eye movement, and determining an option to be highlighted; highlighting the determined option, and distinguishing a component of an event-related potential contained in the electroencephalogram signal based on the timing of highlighting the option as a starting point; and determining an operation of the device based on the distinguished component.

A computer program according to the present invention is a computer program to be executed in an electroencephalogram interface apparatus, the electroencephalogram interface apparatus being incorporated in an electroencephalogram interface system for controlling an operation of a device by utilizing an electroencephalogram signal of a user, the electroencephalogram interface system including an electroencephalogram measurement section for measuring an electroencephalogram signal of the user, an eye movement measurement section for measuring an eye movement of the user, and an output section for presenting on a screen an option which is related to an operation of a device, wherein the computer program causes a computer of the electroencephalogram interface apparatus to execute the steps of: determining whether a predetermined time has elapsed or not since a point in time when a rotational angular velocity of the eye movement measured by the eye movement measurement section becomes equal to or less than a prestored threshold value; if the predetermined time has elapsed, identifying a region of the screen in which the user is fixing his or her gaze based on the eye movement, and determining an option to be highlighted; highlighting the determined option, and distinguishing a component of an event-related potential contained in the electroencephalogram signal based on the timing of highlighting the option as a starting point; determining an operation of the device based on the distinguished component; and adjusting a timing of beginning highlighting based on the eye movement after a process of displaying the screen is begun and until the screen is displayed.

A computer program according to the present invention is a computer program to be executed in an electroencephalogram interface apparatus, the electroencephalogram interface apparatus being incorporated in an electroencephalogram interface system for controlling an operation of a device by utilizing an electroencephalogram signal of a user, the electroencephalogram interface system including an electroencephalogram measurement section for measuring an electroencephalogram signal of the user, an eye movement measurement section for measuring an eye movement of the user, and an output section for presenting on a screen an option which is related to an operation of a device, wherein the computer program causes a computer of the electroencephalogram interface apparatus to execute the steps of: determining whether a predetermined time has elapsed or not since a point in time when a rotational angular velocity of the eye movement measured by the eye movement measurement section becomes equal to or less than a prestored threshold value; if the predetermined time has elapsed, identifying a region of the screen in which the user is fixing his or her gaze based on the eye movement, and determining an option to be highlighted; highlighting the determined option, and distinguishing a component of an event-related potential contained in the electroencephalogram signal based on the timing of highlighting the option as a starting point; and determining an operation of the device based on the distinguished component.

With an electroencephalogram interface apparatus, electroencephalogram interface apparatus, method, and computer program according to the present invention, the options to be highlighted, timing of beginning highlighting, or time interval of highlighting is determined based on an eye movement of the user, concerning the highlighting which is required in an electroencephalogram interface. As a result, in a system having an interface which utilizes an electroencephalogram, it is possible to allow a user wishing to select an option whose displayed position on an electroencephalogram interface is clear, or a user who is unclear as to which option should be selected, to efficiently select the option desired by the user from among a large number of options, without feeling inconvenience or frustration concerning the system.

Other features, elements, processes, steps, characteristics and advantages of the present invention will become more apparent from the following detailed description of preferred embodiments of the present invention with reference to the attached drawings.

(a) of FIG. 5 is a diagram showing an exemplary data structure of integrated first and second calibration information; and (b) of FIG. 5 is a diagram showing exemplary coordinates of a fixation position on a display screen.

Figure 18:
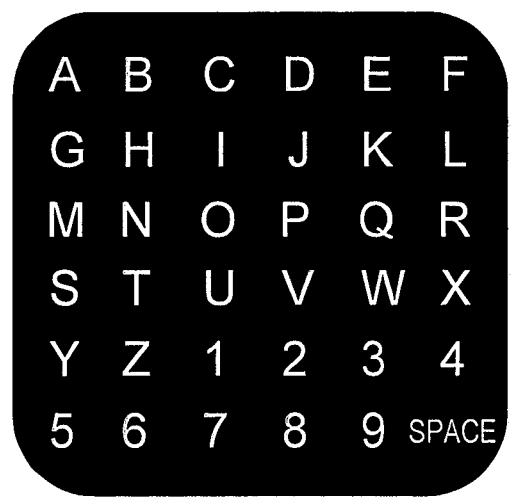

FIG. 6 is a diagram showing an exemplary division when an interface screen of 6×6 options shown in FIG. 18 is divided into nine regions.

Figures 7, 8:
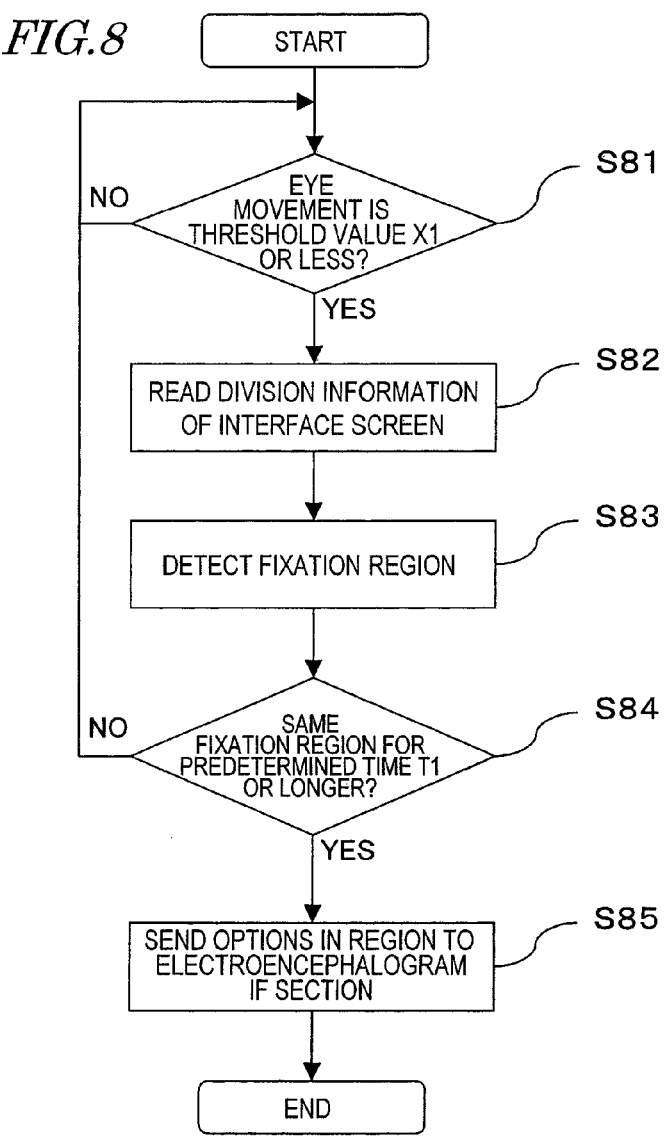

FIG. 7 is a diagram showing an exemplary data structure of division information of each interface screen.

FIG. 8 is a flowchart showing a procedure of processing by a highlight determination section 15.

Figure 9:
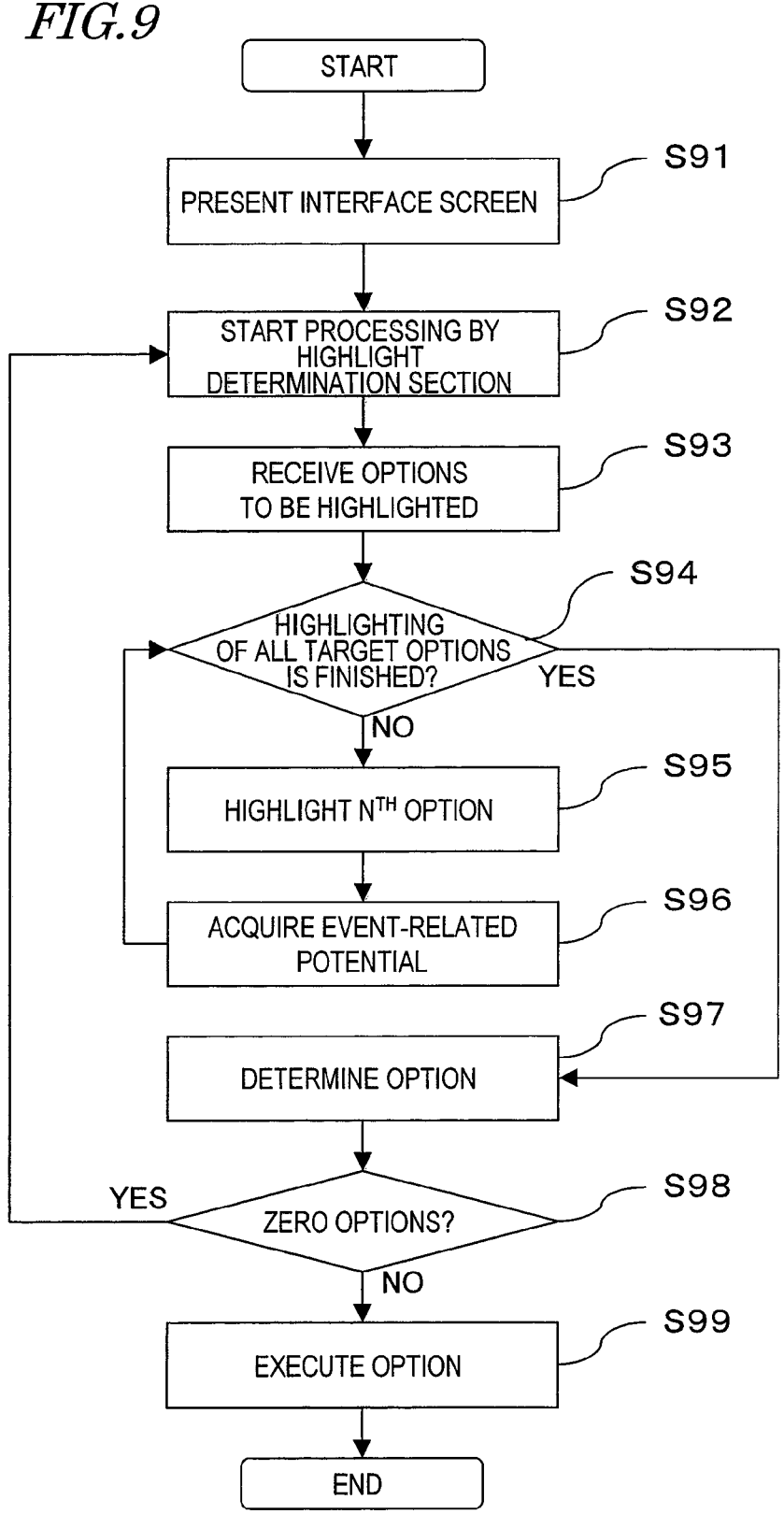

FIG. 9 is a flowchart showing a procedure of processing by an electroencephalogram IF section 14.

Figure 10:
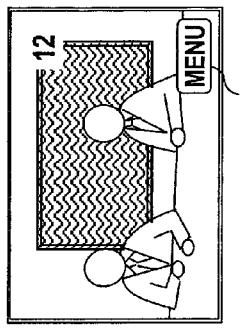

(a) to (e) of FIG. 10 are diagrams showing an example where, in the electroencephalogram interface system 1, a user 10 watches a program on a channel that he or she wishes to view by manipulating a television set.

Figure 11:
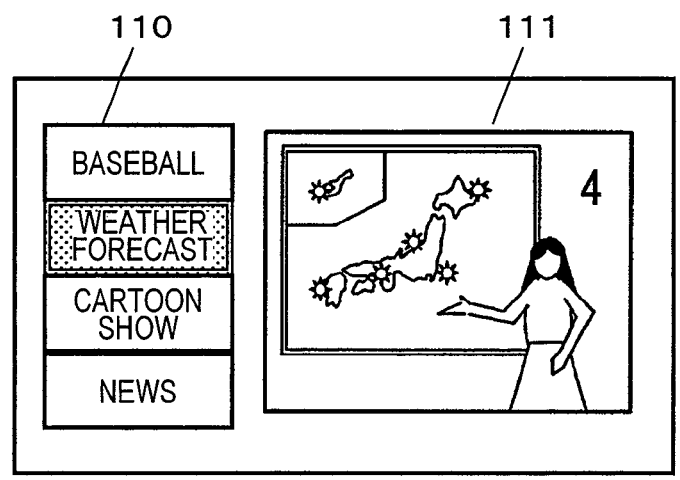

FIG. 11 is a diagram showing an exemplary interface screen in which a content displaying region 111 and a menu displaying region 110 are contained.

(a) and (b) of FIG. 12 are diagrams showing fixation positions on an interface screen as well as a timing chart according to Embodiment 2.

Figure 13:
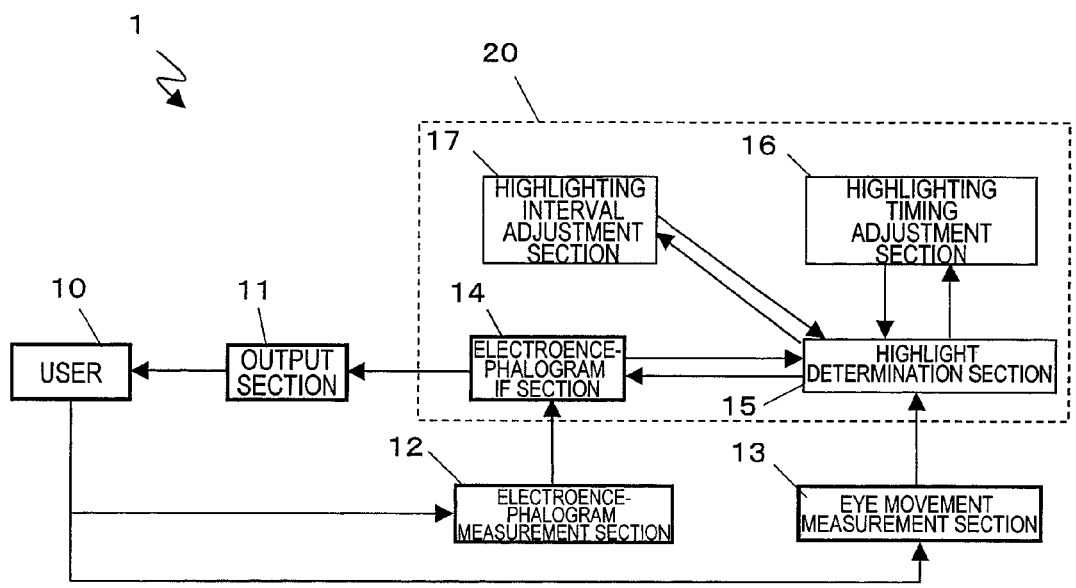

FIG. 13 is a diagram showing the construction of an electroencephalogram interface system 1 according to Embodiment 2.

Figure 14:
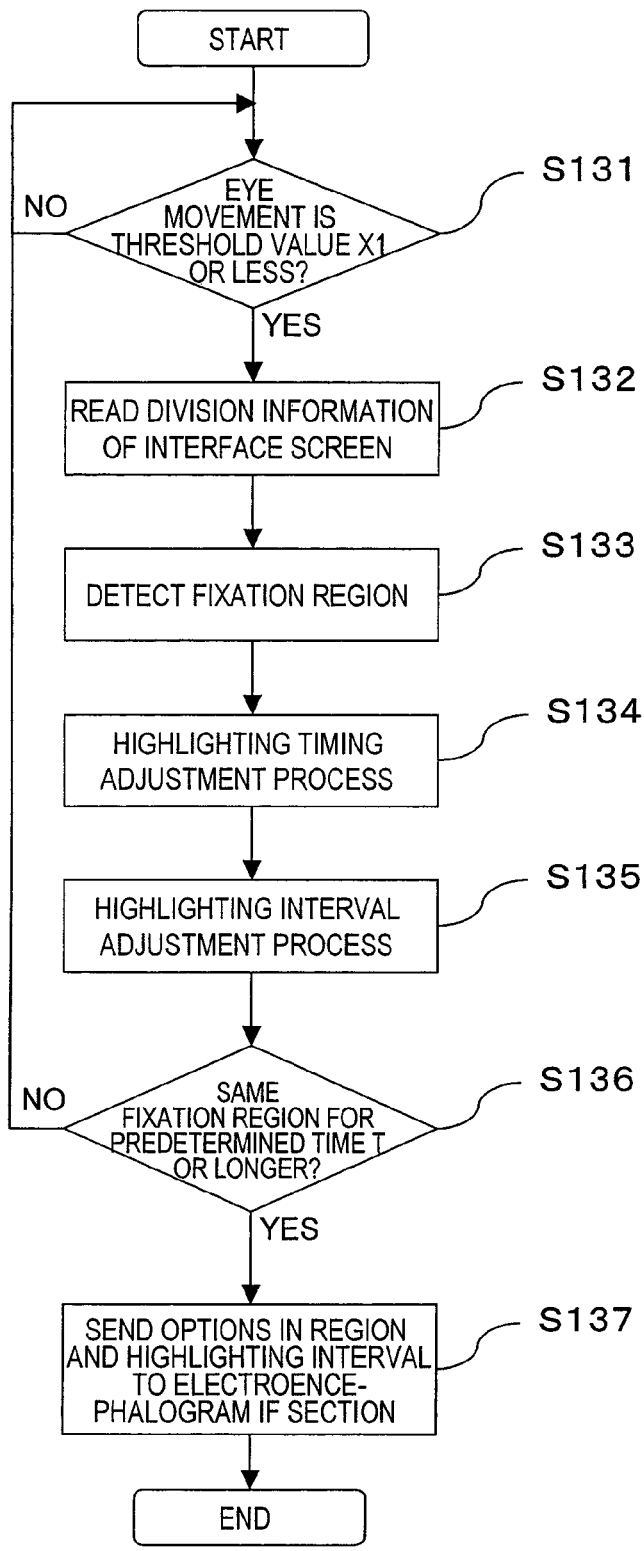

FIG. 14 shows a flowchart showing a procedure of processing by the highlight determination section 15.

Figure 15:
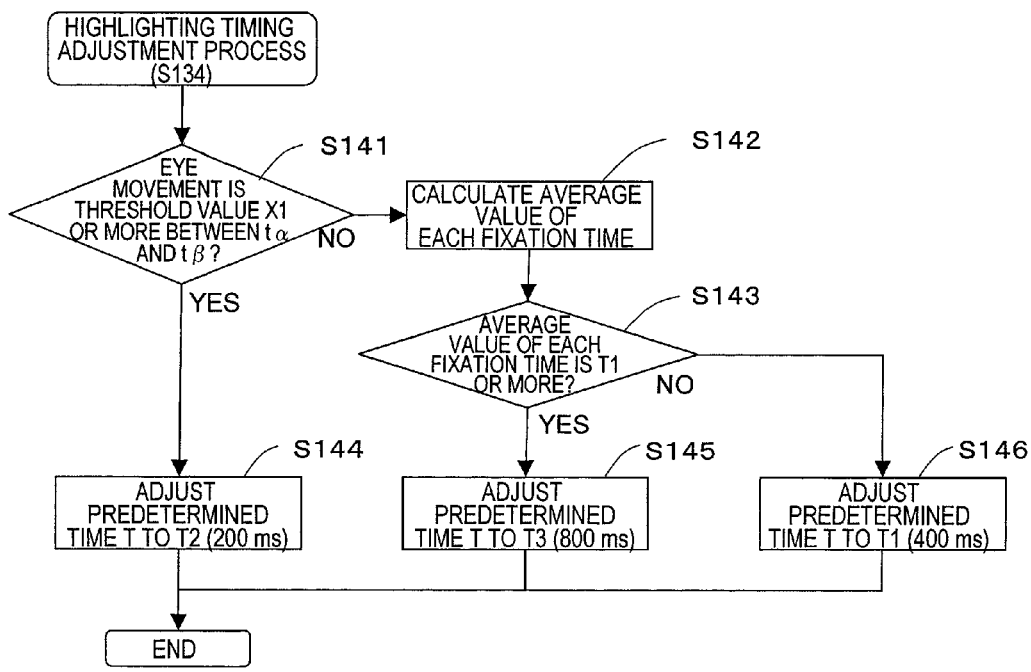

FIG. 15 is a flowchart showing a procedure of processing by a highlighting timing adjustment section 16.

Figure 16:
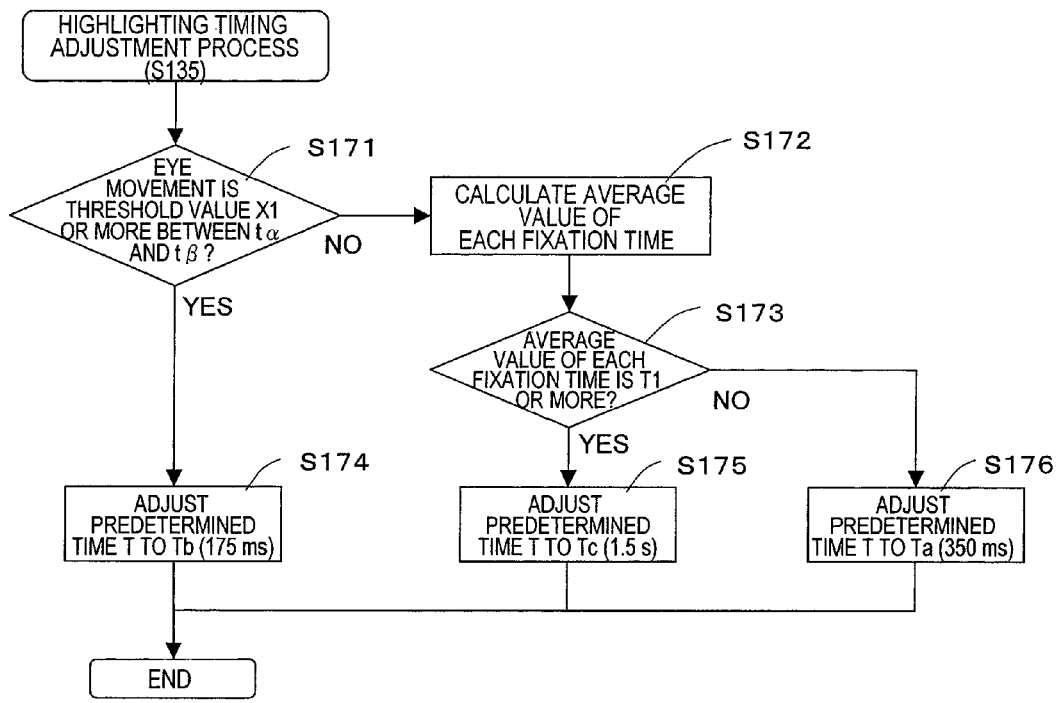

FIG. 16 is a flowchart showing a procedure of processing by a highlighting interval adjustment section 17.

(a) and (b) of FIG. 17 are diagrams showing exemplary divisions when the unit of division for items is changed according to the distance between the user 10 and an output section 11.

FIG. 18 is a diagram showing an exemplary screen indication when an interface according to a conventional example is provided.

DETAILED DESCRIPTION OF PREFERRED EMBODIMENTS

Hereinafter, with reference to the attached drawings, embodiments of the electroencephalogram interface system and electroencephalogram interface apparatus according to the present invention will be described.

First, the outline of the main features the electroencephalogram interface system and electroencephalogram interface apparatus according to the present invention will be described. Thereafter, respective embodiments of the electroencephalogram interface apparatus will be described.

The inventors envisage that, in future, a brainwave interface system will be constructed in an environment in which a wearable-type electroencephalograph and a wearable-type display are combined. The user will always be wearing the electroencephalograph and the display, and be able to perform content viewing and screen manipulation by using the wearable-type display. Otherwise, it is envisaged that a brainwave interface system will be constructed in an environment (e.g., home) in which a home television set and a wearable-type electroencephalograph are combined. When watching television, the user is able to perform content viewing and screen manipulation by wearing the electroencephalograph.

Figure 1:
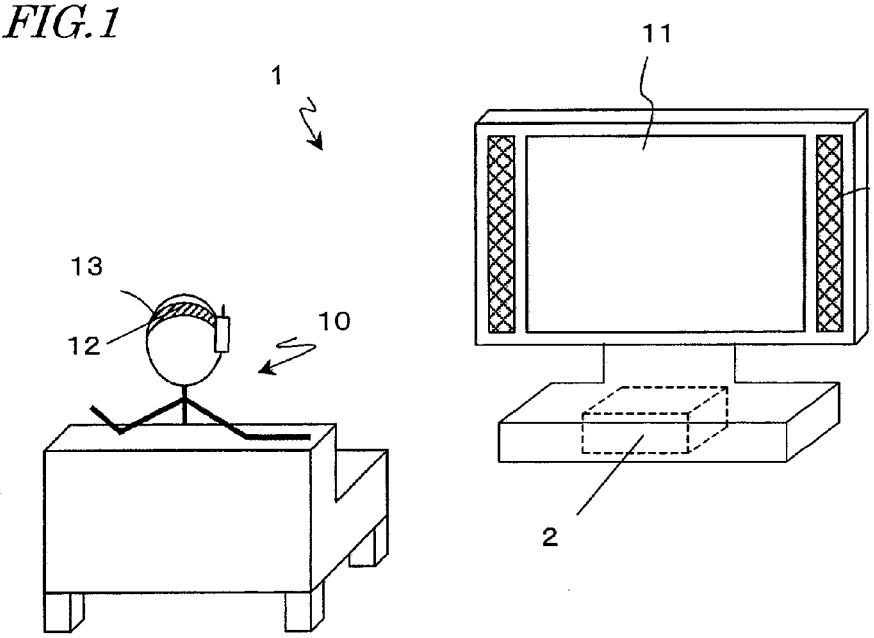
FIG. 1 is a diagram showing a construction and an environment of use for an electroencephalogram interface system 1.

For example, FIG. 1 illustrates a construction and an environment of use for the brainwave interface system 1 as envisaged by the inventors in the latter example. The electroencephalogram interface system 1 is exemplified so as to correspond to a system construction of Embodiment 1 described later.

The electroencephalogram interface system 1 is a system for providing an interface with which to manipulate (control) a television set 11 by utilizing an electroencephalogram signal from a user 10. An electroencephalogram signal from the user 10 is acquired by an electroencephalograph (electroencephalogram measurement section 12) which is worn on the head of the user, and transmitted to the electroencephalogram interface apparatus 2 in a wireless or wired manner. The eye movements of the user 10 are measured by a measurement instrument for eye movement (eye movement measurement section 13) that is worn on the head of the user, and transmitted to the electroencephalogram interface apparatus 2 in a wireless or wired manner. From the eye movements, the electroencephalogram interface apparatus 2 internalized in the television set 11 determines an option to be highlighted, the timing of beginning highlighting, and a time interval thereof, and recognizes the user's intent by utilizing the P300 component of an event-related potential which constitutes a part of the electroencephalogram, and performs processing such as switching of the channel.

Embodiment 1

Figure 2:
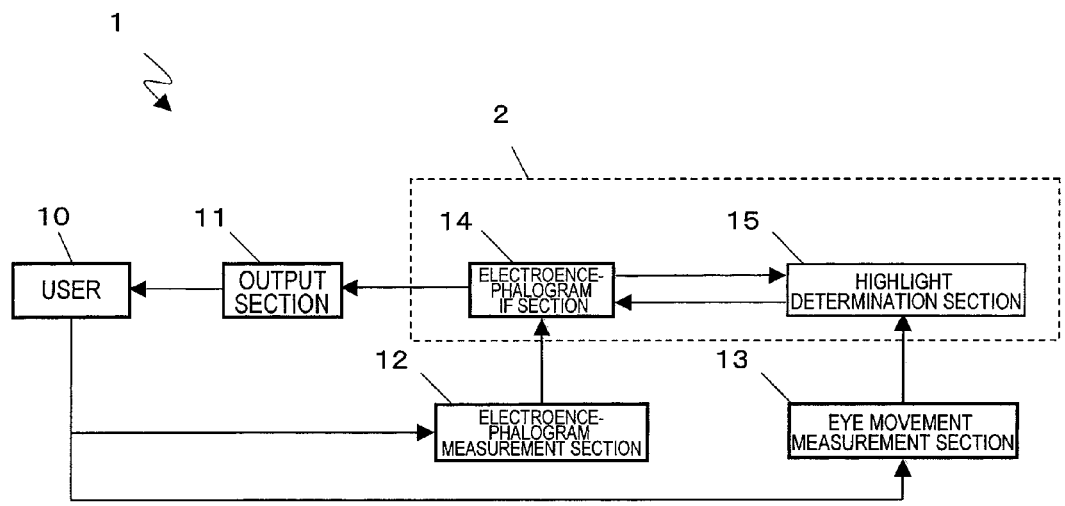
FIG. 2 is a diagram showing the functional block construction of an electroencephalogram interface system 1 according to Embodiment 1.

FIG. 2 shows a functional block construction of the electroencephalogram interface system 1 according to the present embodiment. The electroencephalogram interface system 1 includes an electroencephalogram interface apparatus 2, an output section 11, an electroencephalogram measurement section 12, and an eye movement measurement section 13. The electroencephalogram interface apparatus 2, which is composed of an electroencephalogram interface section (electroencephalogram IF section) 14 and a highlight determination section 15, is connected to each of the output section 11, the electroencephalogram measurement section 12, and the eye movement measurement section 13 in a wired or wireless manner, and performs transmission and reception of signals. The user 10 block is illustrated for convenience of explanation.

To the user 10, the output section 11 outputs a content, or a menu for selection in an electroencephalogram interface. Since the television set 11 shown in FIG. 1 is a specific example of the output section, the following description will refer to the output section with the reference numeral 11. The output section 11 will correspond to a display screen in the case where the substance to be output is moving pictures or still images; and in the case where the substance to be output contains audio, a display screen and a loudspeaker may be used in combination as the output section 11.

The electroencephalogram measurement section 12 is an electroencephalograph which detects an electroencephalogram signal by measuring changes in potential on an electrode that is worn on the head of the user 10. The electroencephalograph may be a head-mount type electroencephalograph as shown in FIG. 1. It is assumed that the user 10 is wearing the electroencephalograph in advance.

Electrodes are disposed on the electroencephalogram measurement section 12 so that, when worn on the head of the user 10, the electrodes come in contact with the head at predetermined positions. The positions of the electrodes may be, for example, Pz (median parietal), A1 (earlobe), and the nasion of the user 10. However, it will suffice if there are at least two electrodes, and potential measurement will be possible with only Pz and A1, for example. These electrode positions are to be determined based on reliability of signal measurements, wearing ease, and the like.

Thus, the electroencephalogram measurement section 12 is able to measure an electroencephalogram of the user 10. The measured electroencephalogram of the user 10 is sampled so as to be computer-processible, and is sent to the electroencephalogram interface apparatus 2. Note that, in order to reduce the influence of noises mixed in the electroencephalogram, the electroencephalogram to be measured in the electroencephalogram measurement section 12 is subjected to band-pass filtering from 0.05 to 20 Hz in advance, and to baseline correction with respect to an average potential at e.g. 200 milliseconds before an interface screen is presented.

Next, with reference to FIG. 3 and FIG. 4, two types of constructions for the eye movement measurement section 13 will be described. Irrespective of which construction is adopted, the eye movement measurement section 13 may be a head-mount type measurement instrument as shown in FIG. 1, and it is assumed that the user 10 is wearing the eye movement measurement section 13 in advance before use of electroencephalogram interface system 1.

Figure 3:
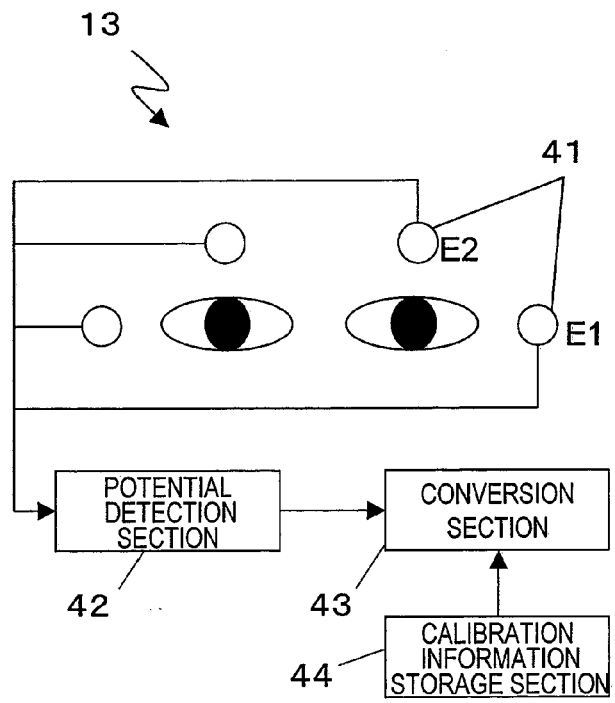
FIG. 3 is a diagram showing the construction of an eye movement measurement section 13 which measures an eye movement by EOG technique.

FIG. 3 shows the construction of an eye movement measurement section 13 which measures an eye movement by EOG technique. On the other hand, FIG. 4 shows the construction of an eye movement measurement section 13 which measures an eye movement by corneal reflection technique. The eye movement measurement section 13 shown in FIG. 3 measures an eye movement by measuring a corneo-retinal potential. On the other hand, the eye movement measurement section 13 shown in FIG. 4 measures an eye movement by taking an image of an eyeball(s) by irradiating the eyeball(s) with near-infrared radiation, and measuring the position of a reflection image (corneal reflection image) of a light source at the pupil and the corneal surface on that image taken.

As will be described later, the eye movement measurement sections 13 shown in FIG. 3 and FIG. 4 both identify a rotational angular velocity and a fixation position of an eyeball (s). This means that an eye movement is defined by a rotational angular velocity when an eyeball has moved, which is a physical amount of change (an angle of rotation of the eye movement per unit time), and an amount of change in the position of the line of sight.

Hereinafter, with reference to FIG. 3 and FIG. 4, it will be described how an eye movement is measured by utilizing each of the EOG technique and the corneal reflection technique. However, these methods are illustrated as mere examples. It would also be possible to use other measurement methods.

The eye movement measurement section 13 shown in FIG. 3 includes a plurality of electrodes 41, a potential detection section 42, a conversion section 43, and a calibration information storage section 44.

The plurality of electrodes 41 are attached around the eyes. The potential detection section 42 measures a corneo-retinal potential which is obtained via the plurality of electrodes 41.

The calibration information storage section 44 stores information (first calibration information) indicating a correspondence between the corneo-retinal potential and the angle of rotation of an eyeball. The first calibration information is obtained by utilizing a characteristic of the cornea of an eyeball, i.e., that the cornea is charged electrically positive with respect to the retina, and is stored in the calibration information storage section 44 in advance. The calibration information storage section 44 also stores information (second calibration information) indicating a relationship between the angle of rotation of an eyeball and a fixation position of the user 10 on a display screen. The second calibration information is also stored in the calibration information storage section 44 in advance.

The conversion section 43 refers to the first calibration information based on the measured corneo-retinal potential, and identifies an angle of rotation and a rotational angular velocity of the eyeball. Then, the conversion section 43 further refers to the second calibration information based on the identified angle of rotation, and identifies a fixation position of the user 10 on the display screen.

FIG. 5(a) shows an exemplary data structure of integrated first and second calibration information. The exemplary calibration information is constructed such that corneo-retinal potentials and angles of rotation of an eyeball along the horizontal direction and the vertical direction and the coordinates of fixation positions on the display screen are associated with one another. Note that the first and second calibration information may be provided independently, without being integrated.

Hereinafter, a method of identifying an angle of rotation and a fixation position of an eyeball by utilizing calibration information will be described.

For example, when the corneo-retinal potential has changed by +50 μV in 1 second along the horizontal direction, the conversion section 43 refers to the calibration information to identify that the fixation position, along the horizontal direction, is X1. When a change of +30 μV has occurred along the vertical direction, the conversion section 43 similarly refers to the calibration information to identify that the fixation position, along the vertical direction, is Y1. As a result, the fixation position of the user 10 on the display screen is identified as coordinates (X1, Y1). FIG. 5(b) shows the exemplary coordinates of a fixation position on the display screen.

Furthermore, in the above example, the amounts of change in the corneo-retinal potential along the horizontal direction and along the vertical direction in 1 second are +50 μV and +30 μV, respectively. Therefore, according to the calibration information shown in FIG. 5(a), it can be said that the eyeball has moved by 5 degrees in the right direction and also moved by 5 degrees in the upper direction. Accordingly, the conversion section 43 can identify the rotational angular velocity of the eyeball to be $(5^2+5^2)^{1/2} \approx 7.07$ degrees/second.

Note that the "angle of rotation of eyeball" and the "fixation position" in the calibration information shown in FIG. 5(a) depend on the distance from the user 10 to the display screen, the size of the display screen, and the like. Therefore, these values do not need to be fixed values, but may be changeable by the user 10 according to each environment of use.

Figure 4:
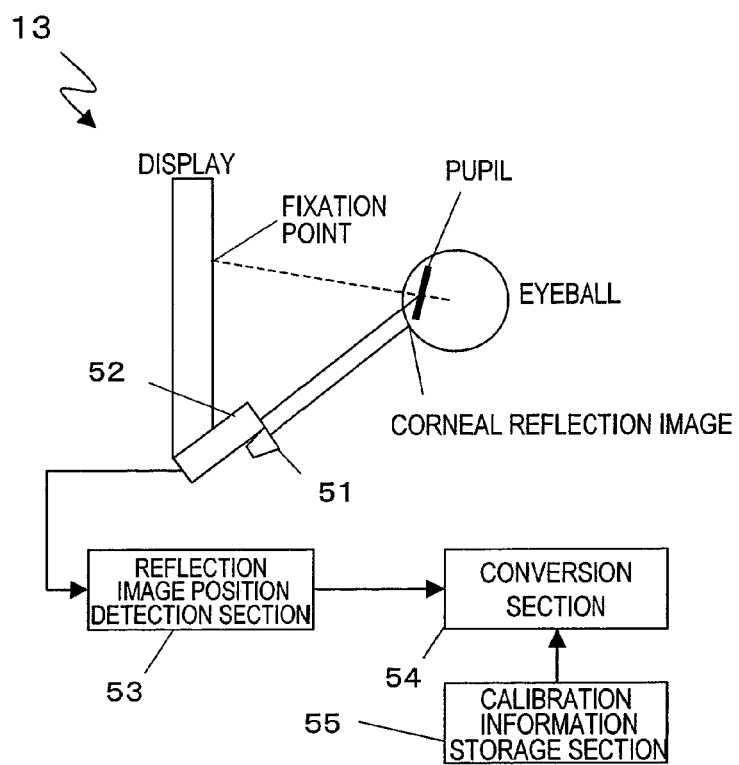
FIG. 4 is a diagram showing the construction of an eye movement measurement section 13 which measures an eye movement by corneal reflection technique.

Next, FIG. 4 is referred to. The eye movement measurement section 13 shown in FIG. 4 includes a near-infrared light source 51, a CCD camera 52, a reflection image position detection section 53, a conversion section 54, and a calibration information storage section 55.

The near-infrared light source 51 is a point light source of near-infrared radiation, and is used for irradiating an eyeball with near-infrared radiation. The CCD camera 52 takes an image of the eyeball which has been irradiated with near-infrared radiation. Based on the video of the eyeball taken, the reflection image position detection section 53 recognizes the pupil and the corneal surface, and furthermore detects the position of a reflection image (corneal reflection image) of the light source at the pupil and the corneal surface.

The calibration information storage section 55 prestores information (third calibration information) indicating a relationship between the position of the reflection image and the angle of rotation of the eyeball, and also prestores information (fourth calibration information) indicating a relationship between the angle of rotation of the eyeball and the fixation position of the user 10 on the display screen.

Based on the position of the reflection image, the conversion section 54 refers to the third calibration information to identify the angle of rotation and the rotational angular velocity of the eyeball. Then, based on the ascertained angle of rotation of the eyeball, the conversion section 54 refers to the fourth calibration information to identify the fixation position of the user 10 on the display screen. The data structures of the third and fourth calibration information are similar to what is shown in FIG. 5(a), and any specific illustration thereof will be omitted.

FIG. 2 is referred to again. From the fixation coordinate position of the user 10 measured by the eye movement measurement section 13, the highlight determination section 15 detects a fixation region of the user 10 on the interface screen, and based on the fixation region, determines a target to be highlighted from among the options. Then, the highlight determination section 15 determines whether or not a predetermined time (e.g., 400 milliseconds) has elapsed since a point in time when the rotational angular velocity of the eyeball became equal to or less than a prestored threshold value, and instructs the electroencephalogram IF section 14 to begin highlighting an option which is present in a region where the line of sight of the user 10 exists, as soon as the predetermined time has elapsed.

The method of determining the threshold value concerning the rotational angular velocity of an eyeball is as follows. According to a prior art document (Japanese Laid-Open Patent Publication No. 2006-204855), the eye movements to occur when a human visually recognizes a still image are generally classified into fixation and saccadic eye movement. As used herein, a "saccadic eye movement" refers to an eye movement when the line of sight is rapidly moving, so that only a little information from the exterior is being perceived. There are reports that a saccadic eye movement has a short duration of 40 to 50 milliseconds, but has an rotational angular velocity exceeding 100 degrees/second. Therefore, the threshold value (X1) for the eye movement may be set to 5 degrees per 50 milliseconds, so that the rotational angular velocity will be 100 degrees/second, for example.

Hereinafter, the function of the highlight determination section 15 will be described in detail, with reference to FIG. 6.

First, it is assumed that each of various interface screens to be presented to the user 10 is divided into a plurality of regions in advance. For example, FIG. 6 shows an exemplary division in the case where an interface screen of 6×6 options shown in FIG. 18 is divided into nine regions. Note, however, that there is no need for any division lines to be displayed on the screen that are visually recognizable to the user 10.

It is assumed that the highlight determination section 15 prestores information concerning what sort of regions the interface screen is divided into.

FIG. 7 shows an exemplary data structure of division information of each interface screen. The division information of an interface screen is composed of: the number of an interface screen of interest; the numbers of respective regions into which the interface screen is divided; the range of each region along the X axis direction; the range of each region along the Y axis direction; and a list of options on the interface screen that are contained in each region.

How (into how many regions) each interface screen is divided in advance is to be determined based on the number of options, the reliability of eye movement measurement, and the like. For example, instead of division into nine as shown in FIG. 6, a coarser division into four, or a finer division into thirty-six may be employed. The former would be effective in the case where the accuracy of eye movement measurement is low, whereas the latter would be effective in the case where the accuracy of eye movement measurement is high.

Furthermore, division of the interface screen can be determined based on the relative positioning of the output section (television set) 11 and the user 10. Specifically, the electroencephalogram measurement section 12 may measure position information (e.g., two-dimensional position) of the user 10, and transmit the position information to the highlight determination section 15. The highlight determination section 15 may prestore position information of the output section 11, and based on the position information of the user 10 and the position information of the output section 11, calculate the distance between the user 10 and the output section 11. Then, by comparing this distance against a threshold value, the unit of division for the screen may be determined.

For example, in the case where the distance between the user 10 and the output section 11 is large, the highlight determination section 15 will adjust the unit of division so as to be larger than a predetermined unit of division. This is because it is difficult for the user 10 to closely look at the items that are displayed on the output section 11. Assuming that the unit of division in FIG. 6 is the predetermined unit of division, the highlight determination section 15 will increase the unit of division as shown in FIG. 17(a). As a result, even if the user 10 is distant from the output section 11, the eye movement of the user 10 can be accurately measured based on the increased unit of division.

On the other hand, in the case where the distance between the user 10 and the output section 11 is small, the highlight determination section 15 will adjust the unit of division so as to be smaller than a predetermined unit of division. This is because the user 10 is able to closely look at the items that are displayed on the output section 11 due to the short distance between the user 10 and the output section 11. Assuming that the unit of division in FIG. 6 is the predetermined unit of division, the highlight determination section 15 will decrease the unit of division as shown in FIG. 17(*b*). As a result, the eye movement of the user 10 can be accurately measured based on the decreased unit of division.

As described above, in the case where the distance between the user 10 and the output section 11 is relatively large so that the accuracy of eye movement measurement is considered to be low, the divisions are made coarse, and priority is given to the distinction based on the electroencephalogram signal. On the other hand, in the case where the distance between the user 10 and the output section 11 is relatively small so that the accuracy of eye movement measurement is considered to be high, the divisions are made fine, and priority is given to the distinction based on eye movement.

As a result, whichever one of the distinction based on eye movement and the distinction based on the electroencephalogram signal that is believed to have a higher accuracy can be used more effectively.

From the eye movement measurement section 13, the highlight determination section 15 receives the information of the rotational angular velocity of the eyeball of the user 10 and the information of the fixation coordinate position on the display screen. For example, when the rotational angular velocity of the eyeball becomes equal to or less than a threshold value, the highlight determination section 15 detects a fixation region of the user 10 on the interface screen, based on the fixation position of the user 10 and the interface screen division information.

When determining that the rotational angular velocity of the eyeball has remained equal to or less than the threshold value and the same fixation region of the user 10 has existed on the interface screen for a predetermined time or longer, the highlight determination section 15 instructs the electroencephalogram IF section 14 to begin highlighting now. At the same time, the highlight determination section 15 determines the zero, one, or plural option(s) contained in the region to be the target(s) of highlighting, and transmits to the electroencephalogram IF section 14 the information of the option(s) which is the target(s) of highlighting. Note that, when there are zero options, it is meant that no option is contained in the region, and accordingly the highlight determination section 15 does not designate any option to be highlighted.

According to Japanese Laid-Open Patent Publication No. 2006-204855, supra, it is reported that the time which is required for a human to achieve fixation for visual recognition is approximately 200 milliseconds to 400 milliseconds. Therefore, the predetermined time (T1) for beginning highlighting may be 400 milliseconds, for example. The procedure of processing by the highlight determination section 15 will be described later with reference to the flowchart of FIG. 8.

The electroencephalogram IF section 14 presents an interface screen concerning device manipulations to the user 10 via the output section 11. Upon receiving a trigger from the highlight determination section 15, the electroencephalogram IF section 14 highlights the option(s) having been determined as the target(s) of highlighting, and cut outs the P300 component of an event-related potential of the electroencephalogram measured by the electroencephalogram measurement section 12 for distinction.

In the case where there is a plurality of options that have been determined as targets of highlighting, the electroencephalogram IF section 14 may subject each highlighted option to distinction, and select one that induces an electroencephalogram signal having the largest maximum amplitude in a given zone, or one that induces the largest average potential in a given zone. Alternatively, the electroencephalogram IF section 14 may select one having the largest coefficient of correlation value with respect to a template.

In the case where there is one option that has been determined as a target of highlighting, the electroencephalogram IF section 14 may finalize that option if the maximum amplitude or average potential of the electroencephalogram signal in a given zone when it is highlighted is equal to or greater than a predetermined threshold value, or finalize that option if its coefficient of correlation value with respect to a template is equal to or greater than a predetermined threshold value.

Note that, generally in the studies of event-related potentials, one same option is highlighted N times (e.g., 5 times, 10 times, or 20 times), that is, a total of 4×N times of highlighting is performed in the case where there are four options having been determined as targets of highlighting; an arithmetic mean for each same option is derived; and then a P300 component distinction is made. However, the processing by the electroencephalogram IF section 14 according to the present embodiment is not limited to this number of summations. The procedure of processing by the electroencephalogram IF section 14 will be described later with reference to the flowchart of FIG. 9.

Next, with reference to the flowcharts of FIG. 8 and FIG. 9 as well as FIG. 10, the procedures of processing by the highlight determination section 15 and the electroencephalogram IF section 14 shown in FIG. 2 will be described. FIG. 10 shows an exemplary display where, in the electroencephalogram interface system 1, the user 10 has selected "CH21" as a television channel that he or she wishes to view, from among 16 channels.

FIG. 8 is a flowchart showing the procedure of processing by the highlight determination section 15.

Firstly, it is assumed that a screen as shown in FIG. 10(*a*) is being displayed on the output section 11. When below-described conditions are satisfied, the electroencephalogram IF section 14 displays an interface screen as shown in FIG. 10(*b*) via the output section 11. As a result, an electroencephalogram interface is activated in the electroencephalogram interface system 1.

When an interface screen shown in FIG. 10(*b*) is presented, the highlight determination section 15 begins processing by receiving from the electroencephalogram IF section 14 a screen number which is previously assigned to the interface screen. In the division information shown in FIG. 7, this screen number corresponds to "screen No" at the left end.

At step S81, the highlight determination section 15 determines whether or not the rotational angular velocity of an eyeball received from the eye movement measurement section 13 is equal to or less than the threshold value X1. The following processes are performed only when it is equal to or less than the threshold value X1.

At step S82, based on the screen number of the interface screen received from the electroencephalogram IF section 14, the highlight determination section 15 reads the prestored division information (FIG. 7) of the interface screen. As a result, via the output section 11, the interface screen as shown in FIG. 10(*b*) is presented by the electroencephalogram IF section 14. In the interface screen shown in FIG. 10(*b*), 16 options (i.e., television channels CH00 to CH33) are being displayed, such that the interface screen is divided into four regions from region A to region D.

At step S83, based on the division information of the interface screen and the fixation position of the user 10 on the display screen as received from the eye movement measurement section 13, the highlight determination section 15 detects a fixation region of the user 10 on the interface screen. In the example of FIG. 10(b), it can be inferred that the fixation position of the user 10 is in the lower left region C in the screen, and therefore the fixation region of the user 10 is considered as the lower left region C in the screen. Note that the position that is gazed at by the user 10 is not always stationary, but is fluctuating, if slightly. Therefore, in FIG. 10(b), the fixation position is shown as a range indicated by a dotted line, rather than a single point.

At step S84, the highlight determination section 15 determines whether or not the fixation position of the user 10 has remained within the same region for the predetermined time (T1) or longer. If it has remained within the same region, control proceeds to step S85. If it has not remained within the same region, control returns to step S81. Note that a "region" in which a fixation position exists means a region which is set within the interface screen. Even if the user 10 fixes his or her gaze at a point which is outside the interface screen for the predetermined time (T1) or longer, control will return to step S81, without proceeding to step S85.

At step S85, the highlight determination section 15 elects the option(s) contained in the above region as the target(s) of highlighting, and transmits the list of options to the electroencephalogram IF section 14. Triggered by this, the electroencephalogram IF section 14 begins highlighting. This means that highlighting is begun when the predetermined time (T1) has elapsed. In the example of FIG. 10(b), the four which are contained in the lower left region C of the screen, i.e., CH20, CH21, CH30, and CH31, are determined as the targets of highlighting.

Next, FIG. 9 is a flowchart showing a procedure of processing by the electroencephalogram IF section 14. At step S91, the electroencephalogram IF section 14 presents an interface screen via the output section 11. For example, when the user 10 is viewing a content, a screen before selection as shown in FIG. 10(a) (which in this case is news) is displayed on the display of the television set. At this time, a menu icon 100 saying "menu" is being displayed at the lower right of the screen, and is flickering at a specific frequency.

When the user 10 looks at the menu 100, a specific frequency component corresponding to the flickering of the icon 100 is superposed on the electroencephalogram. By distinguishing the power spectrum of the frequency components of the flickering period in the electroencephalogram signal, the electroencephalogram IF section 14 is able to determine whether the user 10 is looking at the menu icon 100 or not. If it is determined that the user 10 is looking at the menu icon 100, the electroencephalogram IF section 14 is able to activate an electroencephalogram interface. To "activate an electroencephalogram interface" means to begin the operation of providing an interface for making a selection or the like by using an electroencephalogram. As the electroencephalogram interface is activated, the interface screen as shown in FIG. 10(b) is displayed.

At step S92, the electroencephalogram IF section 14 transmits the number of the interface screen to the highlight determination section 15, thus causing the highlight determination section 15 to begin the aforementioned process.

At step S93, from the highlight determination section 15, the electroencephalogram IF section 14 receives a trigger to begin highlighting and a list of options to be highlighted. In the example of FIG. 10(b), CH20, CH21, CH30, and CH31, which are options within the region C, are described in the list of options to be highlighted.

At step S94, the electroencephalogram IF section 14 determines whether highlighting of all of the options that are targets of highlighting has been finished or not. If it has not been finished, control proceeds to step S95; if it has been finished, control proceeds to step S97.

At step S95, the respective target options are highlighted consecutively or randomly.

FIG. 10(c) shows a manner in which the electroencephalogram IF section 14 randomly highlights each target option via the output section 11. The time interval of highlight switching in this case may be 350 milliseconds, for example. As shown in the examples of screens (c)-1 to (c)-4 in FIG. 10, the four options belonging to the region C which are described in the list of options are the targets of highlighting. Therefore, when the highlighting of all of the four options is finished, the process proceeds to step S97.

In the example of FIG. 10(c), CH20, CH21, CH30, and CH31 are highlighted in this order. Note that highlighting may be a change in at least one of the luminance, hue, and magnitude of an option on the interface screen. Instead of or in addition to highlighting, an option may be indicated with a pointer employing an auxiliary arrow. Moreover, the highlighting order of the options does not need to be random, but may follow a predetermined order, e.g., the order of channel numbers, for example.

At step S96, from the electroencephalogram signal which is measured by the electroencephalogram measurement section 12, the electroencephalogram IF section 14 acquires a P300 component of the event-related potential, based on the point of highlighting each option as a starting point.

At step S97, the electroencephalogram IF section 14 subjects the P300 component of the event-related potential acquired with respect to each option at step S96 to distinction, and determines an option which the user 10 wishes to select. FIG. 10(d) schematically shows an event-related potential based on a point of highlighting each option as a starting point.

Now, it is assumed that the user 10 wishes to watch CH21. As respectively shown in screen (c)-1 to screen (c)-4, electroencephalogram signals 1 to 4 are acquired based on the point of highlighting each option as a starting point. When the user 10 looks at screen (c)-2, in which CH21 is highlighted, a characteristic positive component appears in the electroencephalogram signal, near about 300 milliseconds based on the point of highlighting CH21 as a starting point. As the electroencephalogram IF section 14 distinguishes the appearance of this P300 component, it becomes possible to select the channel which the user 10 wishes to select.

At step S98, if there are zero options that have been determined as the targets of highlighting, or if no characteristic positive component has appeared in the P300 component of the event-related potential, the process of step S92 is executed again. Otherwise, control proceeds to step S99.

At step S99, the electroencephalogram IF section 14 executes the process of the selected device operation. In the example of FIG. 10(e), the electroencephalogram IF section 14 switches the channel to CH21 (weather forecast), whereby a weather forecast program corresponding to CH21 is displayed on the output section 11.

In accordance with the construction and procedures of processing of the present embodiment, the highlight determination section 15 detects a fixation region of the user 10 on an interface screen from his or her eye movement, and based on the fixation region, determines a target to be highlighted from among options. Then, it is determined as to whether or not a predetermined time has elapsed since the point in time when the rotational angular velocity of the eyeball(s) became equal to or less than a prestored threshold value, and highlighting is begun when the predetermined time has elapsed. As a result, in a system having an interface which utilizes an electroencephalogram, even if there many options on the interface screen, e.g., ten and a few, or several dozens, an option which is desired by the user 10 can be efficiently selected from among them.

For example, in the case where 6×6 options exist as shown in FIG. 6, dividing the fixation region into nine will reduce the number of highlighting to four times. This makes it possible to select an option more quickly.

Thus, the highlight determination section 15 determines options to be highlighted, and from among options which are determined as targets of highlighting, the electroencephalogram IF section 14 identifies an option which the user 10 wishes to select. Therefore, unnecessary highlighting can be reduced.

This will be specifically described below.

If the highlight determination section 15 according to the present embodiment were omitted, and options were highlighted by only using the electroencephalogram IF section 14, it might be possible for targets to be highlighted even when the user 10 is not looking at the options or when the user 10 does not wish to select any option.

On the other hand, according to the present embodiment, the highlight determination section 15 determines options which are targets of highlighting, and the electroencephalogram IF section 14 highlights those options and acquires event-related potentials. The targets of highlighting are determined based on the movement of an eyeball. Since no targets of highlighting are determined while the user 10 is not looking at the options, it is guaranteed that the user 10 is always looking at the options whenever options are highlighted. In other words, it will be never the case that the user 10 is not looking at the options so long as the options are highlighted.

Moreover, when the user 10 is looking at the options without an intention of selection, it is presumable that he or she will not be looking at one option for a predetermined time (T1) or longer. In this case, no option will be determined as a target of highlighting. Thus, when the user 10 does not even have an intention of selection, highlighting is prevented from occurring. As a result, unnecessary highlighting can be reduced.

Next, a variant of the present embodiment will be described with reference to FIG. 11. FIG. 11 shows an exemplary interface screen in which a content displaying region 111 and a menu displaying region 110 are included. The options to be selected by the user 10 only exist in the menu displaying region 110.

In such an interface screen, highlighting may be begun only if the fixation region of the user 10 is in the menu displaying region 110 and the fixation region of the user 10 has remained within the same menu displaying region 110 for a predetermined time (T1) or longer since the point when the rotational angular velocity of the eyeball became equal to or less than the threshold value. As a result, unnecessary highlighting can be suppressed while the user 10 is viewing a content, and it is possible to begin highlighting only when the user 10 desires a device operation such as making a menu change.

Embodiment 2

In the electroencephalogram interface system 1 of Embodiment 1, concerning the highlighting which is required for an electroencephalogram interface, options to be highlighted and the timing of beginning the highlighting are determined based on the eye movement of the user 10. In Embodiment 1, the predetermined time from a point when the rotational angular velocity of an eyeball of the user 10 becomes equal to or less than a threshold value and until beginning the highlighting, and the time interval of highlighting, are constant values.

However, an ability to flexibly perform a more efficient selection according to the state of the user would be more preferable. Specifically, in the case where the user 10 knows the positions of options to be displayed on an electroencephalogram interface screen in advance, because of having used the electroencephalogram interface system 1 many times or for some other reasons, it would be more preferable to allow the user 10 to more quickly select such options. Conversely, in the case of a user 10 who is unclear as to what to select, an ability to suppress unnecessary highlighting for allowing the user 10 to smoothly make up his or her mind would be more preferable.

Now, with reference to FIG. 12, the eye movement of the user 10 in the aforementioned states of the user 10 will be described.

In FIGS. 12, (a)-1 and (b)-1 illustrate changes in a fixation position of the user 10 and its changes over time, in the case where the user 10 knows the positions of the options in advance.

FIG. 12(a)-1 shows an interface screen which is constituted from items of a program table (programs A to D) and items of a device manipulation menu. The followings are displayed as items of the device manipulation menu: icons of directions to move (up, down, right, left), for moving the program table; a "Search" item icon for searching for a program which exists in the program table or the like; and a "Recommend" item icon for displaying a recommended program among the programs existing in the program table or the like based on the viewing history of the user 10. The arrow indicates a move of the fixation position of the user 10 from point A to point B.

The interface screen is divided into: a portion given to items which are updated from time to time, e.g., a program table; and a portion where the same items are always indicated in the same places, e.g., a device manipulation menu. However, the device manipulation menu is not limited to the same items being always indicated in the same places, but may be any items which are updated with a lower frequency than that of the items which are updated from time to time (e.g., every hour or every day), such as a program table.

In the present embodiment, the electroencephalogram interface screen is constructed so that any one divided region contains only one item which is in the category of the same-items-being-always-indicated-in-the-same-places (i.e. an item of the device manipulation menu). As a result, as for the selection of the device manipulation menu, only the confirmation as to whether there was a will to select that option is made based on an event-related potential in the electroencephalogram IF section 14, thus making it possible to determine the option more quickly than in the case where there are a plurality of targets of highlighting.

FIG. 12(b)-1 schematically shows changes over time of a point in FIG. 12(a)-1, i.e., the fixation position of the user 10. Time $t\alpha$ in FIG. 12(b)-1 is a point in time at which the process for displaying an interface screen is begun, whereas $t\beta$ is a point in time at which the interface screen is presented. Specifically, the period from time $t\alpha$ to time $t\beta$ represents a period during which displaying is switched from a screen before selection as shown in FIG. 10(a) to a screen as shown in FIG.

10(*b*) (a screen in which items concerning device operations are displayed). In other words, between time tα to time tβ, the interface screen of FIG. 12(*a*) is not displayed yet, and thus the user 10 is in a state where he or she is not sure which items will be displayed on the interface screen by visual inspection.

Herein, time tα may be a predetermined time before the point in time at which the process for displaying an interface screen is begun.

If the user 10 keeps using the electroencephalogram interface many times and becomes acquainted with it, even before the interface screen as shown in FIG. 12(*a*)-1 is displayed, the user 10 will presumably remember the positions of the items on the interface screen to be presented thereafter. For any user 10 who is accustomed to the use of the electroencephalogram interface and remembers the items, an ability to make a quick selection will be desirable.

In the present embodiment, by observing the rotational angular velocity of an eyeball at a point in time before the interface screen is presented (between time tα and time tβ), it becomes possible for the user 10 to quickly select a next desired option. Hereinafter, the details thereof will be described.

It is assumed that the user 10 remembers the items to be displayed on the interface screen and the coordinates of the items and clearly knows the coordinate position of an option of interest on the electroencephalogram interface. In this case, the rotational angular velocity of the eyeball of the user 10 will exhibit a saccadic eye movement before presentation of the interface screen (i.e., between time tα and time tβ), and will be in a state of fixation at the option of interest after the interface screen is presented. The reason is that, if the coordinate position of the option of interest on the interface screen is remembered, the fixation position of the user 10 can move to the region where the option of interest is present, before presentation of the interface screen.

For example, as will be understood from FIG. 12(*b*)-1, the eyeball of the user 10 undergoes a saccadic eye movement before time tβ of presenting the interface screen, and the fixation position moves from the region of "program C" to the region of "Search". Then, after time tβ of presenting the interface screen, it remains in the region of "Search". This can be considered to indicate that the user 10 remembering the coordinate position of "Search" on the interface screen was intending to select "Search" even before the presentation of the interface screen.

As used herein, a "saccadic eye movement" means an eye movement when moving between presented items. Based on a difference in angular velocity of the eye movement, it is possible to distinguish between a saccadic eye movement and an eye movement when any indication which is presented on the interface screen is being read. In other words, it is possible to set angular velocities of eye movement for enabling a distinction between them.

Next, the eye movement of a user 10 who is unclear as to what to select will be described.

Presumably, the eye movement of a user 10 who is unclear as to what to select will have a long fixation time at each fixation position after an interface screen is presented. For example, in the case where the program name to be selected is clear, right after gazing at a program name in a program table, one can immediately decide whether it is the program to be selected or not. However, in the case where the program to be selected has not been determined and is unclear, the fixation time at each fixation position will be longer because of pondering whether or not to select it.

In FIGS. 12, (*a*)-2 and (*b*)-2 show changes in the fixation position of the user 10 and its changes over time in the case where the user 10 is unclear as to what to select.

In this example, there is no particular option of interest, and therefore there is no such thing as a coordinate position of an option of interest on the electroencephalogram interface. Therefore, at any point in time before presentation of the interface screen (between time tα and time tβ), no saccadic eye movement is observed; and after the presentation of the interface screen (after time tβ), the fixation position of the user 10 will move from "program A", "program C", "program B", "Recommend", to "program D", each time experiencing a long fixation time.

In the electroencephalogram interface system of the present embodiment, the predetermined time from a point when the eye movement of the user 10 becomes equal to or less than the threshold value until beginning highlighting, as well as the time interval of highlighting, are adjusted based on the eye movement of the user 10.

More specifically, a case is contemplated where the rotational angular velocity of the eyeball becomes equal to or greater than the prestored threshold value (X1) after an interface screen is activated and before it is actually presented, and the rotational angular velocity of the eye movement becomes equal to or less than the threshold value (X1) for a time (T2) which is shorter than the initial predetermined time (T1) after presentation of the interface screen.

At this time, it is determined that the user 10 is clear as to what to select and remembers its coordinate position on the electroencephalogram interface. Since this point in time as the starting point, highlighting is begun. Thus, by observing the rotational angular velocity of the eyeball before presentation of the interface screen, the user 10 remembering the coordinate position on the electroencephalogram interface can more quickly make a selection. The time interval of highlighting can also be adjusted to be shorter (Tb) than the initial setting value (Ta).

By thus making the time until beginning highlighting and the time interval of highlighting shorter than usual, it becomes possible to allow the aforementioned user 10 to more quickly select the option of interest.

On the other hand, if an average value of the fixation time at each fixation position after presentation of the interface screen becomes equal to or greater than the predetermined time (T1), it is determined that the user 10 is unclear as to what to select. Then, the point in time at which the rotational angular velocity of the eyeball has remained equal to or less than the prestored threshold value (X1) for a time (T3) which is longer than the predetermined time (T1) is determined as the timing of beginning highlighting, and the time interval of highlighting is also adjusted to be longer (Tc) than the initial setting value (Ta). Thus, by making the time until beginning highlighting and the time interval of highlighting longer than usual, it becomes possible to suppress unnecessary highlighting for the aforementioned user 10.

Examples of electroencephalogram interfaces in the case where the time intervals of highlighting are set to milliseconds, 350 milliseconds, and 1.5 seconds are reported in prior art documents: Eric W. Sellers, "A P300 event-related potential brain-computer interface (BCI): The effects of matrix size and inter stimulus interval on performance", BIOLOGICAL PSYCHOLOGY, 73 (2006), 242-252; and Japanese Laid-Open Patent Publication No. 2005-21569.

Accordingly, in the present embodiment, for example, the initial setting value (Ta) of the time interval of highlighting is 350 milliseconds; the shorter adjustment (Tb) is 175 milliseconds; and the longer adjustment (Tc) is seconds.

Moreover, Japanese Laid-Open Patent Publication No. 2006-204855, also a prior art document, states that the time required for fixation when a human performs a visual recognition is approximately 200 milliseconds to 400 milliseconds. Accordingly, in the present embodiment, the initial setting value (T1) of the predetermined time until beginning highlighting is 400 milliseconds; the shorter adjustment (T2) is 200 milliseconds; and the longer adjustment (T3) is 800 milliseconds to allow for leeway.

FIG. 13 shows the construction of the electroencephalogram interface system 1 according to the present embodiment. The electroencephalogram interface system 1 according to the present embodiment includes an electroencephalogram interface apparatus 20, which is different from the electroencephalogram interface apparatus 2 of Embodiment 1.

The electroencephalogram interface apparatus 20 is constructed by adding a highlighting timing adjustment section 16 and a highlighting interval adjustment section 17 to the electroencephalogram interface apparatus 2 of Embodiment 1. Note that the highlighting timing adjustment section 16 and the highlighting interval adjustment section 17 may be simply referred to as the "timing adjustment section" and the "interval adjustment section", respectively.

As has been described earlier, the highlighting timing adjustment section 16 adjusts the predetermined time after the rotational angular velocity of the eyeball becomes equal to or less than the prestored threshold value (X1) and until beginning highlighting. The highlighting interval adjustment section 17 adjusts the time interval of highlighting.

FIG. 14 shows the procedure of processing by the highlight determination section 15. The differences from the flowchart (FIG. 8) of the highlight determination section 15 of Embodiment 1 are that a highlighting timing adjustment process of step S134 and a highlighting interval adjustment section of step S135 are added, and that a highlighting interval is added to the information to be transmitted to the electroencephalogram IF section 14 at step S137. Hereinafter, these processes will be described.

At step S131, it is determined whether or not the rotational angular velocity of the eyeball received from the eye movement measurement section 13 is equal to or less than the threshold value X1. The following processes are performed only when it is equal to or less than the threshold value X1.

At step S132, based on the screen number of the interface screen received from the electroencephalogram IF section 14, the highlight determination section 15 reads the prestored division information (FIG. 7) of the interface screen.

At step S133, based on the division information of the interface screen and the fixation position of the user 10 on the display screen as received from the eye movement measurement section 13, the highlight determination section 15 detects a fixation region of the user 10 on the interface screen.

At step S134, the highlighting timing adjustment section 16 performs an adjustment process for the timing of beginning highlighting. The details of this process will be described later with reference to FIG. 15.

At step S135, the highlighting interval adjustment section 17 performs an adjustment process for the time interval of highlighting. The details of this process will be described later with reference to FIG. 16.

At step S136, the highlight determination section determines whether or not the fixation position of the user 10 has remained within the same region for the predetermined time (T1) or longer. If it has remained within the same region, control proceeds to step S137. If it has not remained within the same region, control returns to step S131. Note that the predetermined time T until beginning highlighting has been adjusted at step S134.

At step S137, the highlight determination section determines this point in time to be the timing of beginning highlighting, elects the option(s) contained in the above region as the target(s) of highlighting, and transmits the list of options and the highlighting interval having been adjusted at step S135 to the electroencephalogram IF section 14. Triggered by this, the electroencephalogram IF section 14 begins highlighting.

FIG. 15 shows the procedure of processing by the highlighting timing adjustment section 16. Through the processing shown in FIG. 15, the predetermined time until beginning highlighting is set to either one of T1, T2, or T3.

Hereinafter, it is assumed that the predetermined times T1, T2, and T3 until beginning highlighting are 400 milliseconds, 200 milliseconds, and 800 milliseconds, respectively. In other words, the relationship of T2<T1<T3 is assumed.

At step S141, the highlighting timing adjustment section 16 determines whether or not the rotational angular velocity of the eyeball became equal to or greater than the prestored threshold value (X1) between tα and tβ in FIG. 12(b)-1, i.e., during the period after the interface screen is activated and until it is actually presented. If it became equal to or greater than the threshold value X1, control proceeds to step S144; otherwise, control proceeds to step S142.

At step S142, the highlighting timing adjustment section 16 calculates an average value of the fixation time at each fixation position after presentation of the interface screen.

At step S143, the highlighting timing adjustment section 16 determines whether or not the average value calculated at step S142 is equal to or greater than the predetermined time (T1). If it is equal to or greater than the predetermined time (T1), control proceeds to step S145; otherwise, control proceeds to step S146.

At step S144, the highlighting timing adjustment section 16 adjusts the predetermined time until beginning highlighting to T2, which is shorter than the initial setting value.

At step S145, the highlighting timing adjustment section 16 adjusts the predetermined time until beginning highlighting to T3, which is longer than the initial setting value.

At step S146, the highlighting timing adjustment section 16 adjusts the predetermined time until beginning highlighting to T1, i.e., the same value as the initial setting value.

FIG. 16 shows the procedure of processing by the highlighting interval adjustment section 17. Through the processing shown in FIG. 16, the time interval of highlighting is set to either one of Ta, Tb, or Tc.

Hereinafter, it is assumed that the time intervals of highlighting Ta, Tb, and Tc are 350 milliseconds, 175 milliseconds, and 1.5 seconds, respectively. In other words, the relationship of Tb<Ta<Tc is assumed.

From step S171 to step S173, the highlighting interval adjustment section 17 executes processes similar to steps S141 to S143 shown in FIG. 15 described above.

At step S174, the highlighting interval adjustment section 17 adjusts the time interval of highlighting to Tb, which is shorter than the initial setting value.

At step S175, the highlighting interval adjustment section 17 adjusts the time interval of highlighting to Tc, which is longer than the initial setting value.

At step S176, the highlighting interval adjustment section 17 adjusts the time interval of highlighting to Ta, i.e., the same value as the initial setting value.

In accordance with the construction and procedures of processing of the present embodiment, in a system having an interface which utilizes an electroencephalogram, the predetermined time until beginning highlighting and the time interval of highlighting are adjusted based on the eye movement of the user 10. As a result, in the case where the user 10 clearly knows the coordinate position of a desired option for selection on an electroencephalogram interface, the user 10 is allowed to select the option more quickly. Conversely, in the case of a user 10 who is unclear as to what to select, unnecessary highlighting can be suppressed in order to allow the user 10 to smoothly make up his or her mind.

Note that, in the present embodiment, the operation of the electroencephalogram interface apparatus 20 has been described with reference to the exemplary screens shown in (a)-1 and (a)-2 of FIG. 12. However, this does not imply any inapplicability to the exemplary screen shown in FIG. 10(b), with reference to which Embodiment 1 was described. The arrow from point A to point B shown in (a)-1 of FIG. 12 is similarly applicable to the exemplary screen of FIG. 10(b). However, in this case, point A is a fixation position at a point in time when the process of displaying the interface screen is begun in response to the user 10 fixing his or her gaze at the menu icon 100 of FIG. 10(a), whereas point B is a fixation position at a point in time before presentation of the interface screen of FIG. 10(b).

In either one of the Embodiments described above, any process that was described by employing a flowchart can be implemented as a program to be executed by a computer. Such a computer program may be distributed on the market in the form of a product recorded on a storage medium such as a CD-ROM, or transmitted via telecommunication lines, e.g., the Internet.

For example, the electroencephalogram interface apparatus 2 shown in FIG. 2 is implemented as a general-purpose processor (semiconductor circuit) which executes a computer program. Alternatively, it may be implemented as a special processor in which such a computer program and a processor are integrated.

The eye movement measurement section 13 and the electroencephalogram measurement section 12 can also be implemented as a general-purpose processor (semiconductor circuit) or a special processor (semiconductor circuit) executing a computer program. For example, a process of the eye movement measurement section 13 of calculating the angle of rotation and the rotational angular velocity of an eyeball based on an acquired corneo-retinal potential can be implemented as a program. A band-pass filtering process and a baseline correction process by the electroencephalogram measurement section 12 can also be implemented as programs.

With an electroencephalogram interface apparatus according to the present invention and an electroencephalogram interface system in which such an apparatus is incorporated, concerning the highlighting which is required in an electroencephalogram interface, the options to be highlighted, the timing of beginning highlighting, and the time interval of highlighting are determined based on an eye movement of a user. This is useful for improving the manipulability of an information device, an audio-video device, or the like in which a device manipulation interface utilizing an electroencephalogram is incorporated.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An electroencephalogram interface system for controlling an operation of a device by utilizing an electroencephalogram signal of a user, comprising:
   an electroencephalogram measurement section for measuring an electroencephalogram signal of the user;
   an eye movement measurement section for measuring an eye movement of the user;
   an output section for presenting on a screen an interface screen containing an option which is related to an operation of a device;
   a highlight determination section for determining whether a predetermined time has elapsed or not since a point in time when a rotational angular velocity of the eye movement becomes equal to or less than a prestored threshold value, and if the predetermined time has elapsed, identifying a region of the interface screen in which the user is fixing his or her gaze based on the eye movement, and determining an option to be highlighted;
   an interface section for highlighting the option determined by the highlight determination section, distinguishing a component of an event-related potential contained in the electroencephalogram signal based on the timing of highlighting the option as a starting point, and determining an operation of the device based on the distinguished component; and
   a timing adjustment section for adjusting a time period before beginning highlighting of the option, based on the eye movement relative to a position of the option after a process of displaying the interface screen is begun and until the interface screen.

2. The electroencephalogram interface system of claim 1, wherein, if an amount of change in the eye movement becomes equal to or greater than the prestored threshold value, the timing adjustment section causes highlighting of the option to be begun when the amount of change in the eye movement has remained equal to or less than the prestored threshold value for a time which is shorter than the predetermined time after the option on the screen is displayed.

3. The electroencephalogram interface system of claim 1, wherein, if the user fixes his or her gaze in a region of the screen after the option on the screen is displayed, the timing adjustment section measures a fixation time in each fixation region, and, if an average value of the measurement time becomes equal to or greater than the predetermined time, causes the option to be highlighted when an amount of change in the eye movement has remained equal to or less than the prestored threshold value for a time which is longer than the predetermined time.

4. The electroencephalogram interface system of claim 1, wherein the highlight determination section determines an option which is contained in the region of the screen as an option to be highlighted.

5. The electroencephalogram interface system of claim 1, wherein the interface section changes, on the screen, at least one of luminance, hue, and magnitude of the option having been determined by the highlight determination section, thereby highlighting the determined option.

6. The electroencephalogram interface system of claim 1, wherein the interface section changes a method of highlighting depending on the number of options determined by the highlight determination section.

7. The electroencephalogram interface system of claim 6, wherein, if there is a plurality of options determined by the highlight determination section, the plurality of options are highlighted randomly or consecutively with a predetermined highlighting interval.

8. The electroencephalogram interface system of claim 1, wherein the highlight determination section determines no option to be highlighted if no option exists in the region of the screen.

9. The electroencephalogram interface system of claim 1, further comprising an interval adjustment section for adjusting a time interval of highlighting based on the eye movement.

10. The electroencephalogram interface system of claim 9, wherein the interval adjustment section adjusts a time interval of highlighting based on the eye movement after the process of displaying the option on the screen is begun and until the option is displayed on the screen.

11. The electroencephalogram interface system of claim 10, wherein, if an amount of change in the eye movement becomes equal to or greater than the prestored threshold value, the interval adjustment section adjusts the time interval of highlighting to be shorter than a setting value when an amount of change in the eye movement has remained equal to or less than the prestored threshold value for a time which is shorter than the predetermined time after the option on the screen is displayed.

12. The electroencephalogram interface system of claim 10, wherein, if the user fixes his or her gaze in a region of the screen after the option on the screen is displayed, the interval adjustment section measures a fixation time in each fixation region, and, if an average value of the measurement time becomes equal to or greater than the predetermined time, adjusts the time interval of highlighting to be longer than a setting value.

13. The electroencephalogram interface system of claim 1, wherein when an option related to an operation of a device is not displayed, the timing adjustment section adjusts a timing of beginning highlighting, based on the eye movement after a process of displaying the option on the screen is begun and until the option is displayed on the screen.

14. The electroencephalogram interface system of claim 1, wherein when the highlight determination section determines that the rotational angular velocity becomes equal to or greater than the prestored threshold value before the interface screen is displayed, and the rotational angular velocity become equal to or less than the prestored threshold value after the interface screen is displayed, the time adjusting section shortens at least one of the timing before beginning highlighting of the option and an interval between highlighting successive options.

15. The electroencephalogram interface system of claim 1, wherein when the highlight determination section determines that the rotational angular velocity becomes equal to or greater than the prestored threshold value after the interface screen is displayed, the time adjusting section lengthens at least one of the timing before beginning highlighting of the optoin and an interval between highlighting successive options.

16. The electroencephalogram interface system of claim 1, wherein the output section presents on the interface screen a content displaying region and a menu displaying region, and the interface section begins highlighting the option when the highlighting determination section determines that the user is fixing his or her gaze on the menu displaying region for the predetermined time.

17. An electroencephalogram interface apparatus for use in an electroencephalogram interface system for presenting on a screen an interface screen containing an option which is related to an operation of a device, and controlling an operation of the device by utilizing an eye movement and an electroencephalogram signal of the user, wherein, the electroencephalogram interface system includes an electroencephalogram measurement section for measuring an electroencephalogram signal of the user, and an eye movement measurement section for measuring an eye movement of the user, the electroencephalogram interface apparatus comprising:

a highlight determination section for determining whether a predetermined time has elapsed or not since a point in time when a rotational angular velocity of the eye movement received from the eye movement measurement section becomes equal to or less than a prestored threshold value, and if the predetermined time has elapsed, identifying a region of the interface screen in which the user is fixing his or her gaze based on the eye movement, and determining an option to be highlighted;

an interface section for highlighting the option determined by the highlight determination section, distinguishing a component of an event-related potential contained in the electroencephalogram signal received from the electroencephalogram measurement section based on the timing of highlighting the option as a starting point, and determining an operation of the device based on the distinguished component; and a timing adjustment section for adjusting a time period before beginning highlighting of the option, based on the eye movement relative to a position of the option after a process of displaying the interface screen is begun and until the interface screen is displayed.

18. A method for use in an electroencephalogram interface system for controlling an operation of a device by utilizing an electroencephalogram signal of a user, comprising the steps of:

measuring an electroencephalogram signal of the user;

measuring an eye movement of the user;

presenting on a screen an interface screen containing an option which is related to an operation of a device;

determining whether a predetermined time has elapsed or not since a point in time when a rotational angular velocity of the eye movement becomes equal to or less than a prestored threshold value;

if the predetermined time has elapsed, identifying a region of the interface screen in which the user is fixing his or her gaze based on the eye movement, and determining an option to be highlighted;

highlighting the determined option, and distinguishing a component of an event-related potential contained in the electroencephalogram signal based on the timing of highlighting the option as a starting point;

determining an operation of the device based on the distinguished component; and adjusting a time period before beginning highlighting of the option based on the eye movement relative to a position of the option after a process of displaying the interface screen is begun and until the interface screen is displayed.

19. A computer program stored on a non-transitory computer-readable medium and executed by an electroencephalogram interface apparatus, the electroencephalogram interface apparatus being incorporated in an electroencephalogram interface system for controlling an operation of a device by utilizing an electroencephalogram signal of a user, the electroencephalogram interface system including
an electroencephalogram measurement section for measuring an electroencephalogram signal of the user,
an eye movement measurement section for measuring an eye movement of the user, and
an output section for presenting on a screen an interface screen containing an option which is related to an operation of a device, wherein
the computer program causes a computer of the electroencephalogram interface apparatus to execute the steps of:
determining whether a predetermined time has elapsed or not since a point in time when a rotational angular velocity of the eye movement measured by the eye movement measurement section becomes equal to or less than a prestored threshold value;
if the predetermined time has elapsed, identifying a region of the interface screen in which the user is fixing his or her gaze based on the eye movement, and determining an option to be highlighted;
highlighting the determined option, and distinguishing a component of an event-related potential contained in the electroencephalogram signal based on the timing of highlighting the option as a starting point;
determining an operation of the device based on the distinguished component; and
adjusting a time period before beginning highlighting of the option based on the eye movement relative to a position of the option after a process of displaying the interface screen is begun and until the interface screen is displayed.

* * * * *